United States Patent
Ogawa

(10) Patent No.: US 11,113,377 B2
(45) Date of Patent: Sep. 7, 2021

(54) AUTHENTICATION SYSTEM, AND INFORMATION RECORDING MEDIUM

(71) Applicant: Passlogy Co., Ltd., Tokyo (JP)

(72) Inventor: Hideharu Ogawa, Tokyo (JP)

(73) Assignee: Passlogy, Co., Ltd.

( * ) Notice: Subject to any disclaimer, the term of this patent is extended or adjusted under 35 U.S.C. 154(b) by 282 days.

(21) Appl. No.: 16/327,261

(22) PCT Filed: Aug. 22, 2016

(86) PCT No.: PCT/JP2016/074379
§ 371 (c)(1),
(2) Date: Feb. 21, 2019

(87) PCT Pub. No.: WO2018/037453
PCT Pub. Date: Mar. 1, 2018

(65) Prior Publication Data
US 2019/0188369 A1 Jun. 20, 2019

(51) Int. Cl.
*G06F 21/35* (2013.01)
*G06F 21/36* (2013.01)
(Continued)

(52) U.S. Cl.
CPC ............ *G06F 21/35* (2013.01); *G06F 21/31* (2013.01); *G06F 21/36* (2013.01); *H04L 9/32* (2013.01); *H04L 9/3236* (2013.01)

(58) Field of Classification Search
CPC .......... G06F 21/35; G06F 21/31; G06F 21/36; G06F 21/34; G06F 21/44; G06F 21/33;
(Continued)

(56) References Cited

U.S. PATENT DOCUMENTS

2013/0132731 A1* 5/2013 Ruan ................... H04L 9/0866 713/184
2017/0257359 A1* 9/2017 Ogawa ............... H04L 63/0853

FOREIGN PATENT DOCUMENTS

EP 1050789 A2 11/2000
EP 1849119 A2 10/2007
(Continued)

OTHER PUBLICATIONS

Japanese Office Action for Japanese Patent Application Serial No. 2017-021898 drafted on Oct. 13, 2020 (Original and translation included).
(Continued)

*Primary Examiner* — Nelson S. Giddins
(74) *Attorney, Agent, or Firm* — K&L Gates; Louis C. Cullman; Dennis A. Majewski

(57) ABSTRACT

A management device (181) calculates, from access information transmitted from a token terminal (121) and a site seed assigned to a server (161), a user seed, and registers the user seed in the token terminal (121). The token terminal (121) obtains a share seed to be shared with the server (161) independently therefrom, calculates a key code from the share seed and the user seed, and presents the key code to the user. When the user enters the key code to an access terminal (141), the access terminal (141) transmits, to the server (161), a request having the key code specified. The server (161) obtains access information relating to the transmitted request, calculates a checkup seed from the access information and the site seed assigned to the server (161), obtains a share seed independently from the token terminal (121), calculates a checkup code from the share seed and the checkup seed, and sets a necessary condition for sign-in that is consistent between the key code and the checkup code.

21 Claims, 10 Drawing Sheets

(51) Int. Cl.
*H04L 9/32* (2006.01)
*G06F 21/31* (2013.01)

(58) Field of Classification Search
CPC .......... G06F 21/51; G06F 21/57; G06F 21/64; H04L 9/32; H04L 9/3234; H04L 9/3236; H04L 9/3242; H04L 63/062; H04L 63/12; H04L 63/0823; H04L 63/0853
See application file for complete search history.

(56) References Cited

FOREIGN PATENT DOCUMENTS

| | | |
|---|---|---|
| EP | 2866164 A1 | 4/2015 |
| JP | 2001-357018 A | 12/2001 |
| JP | 2002-259344 A | 9/2002 |
| JP | 2005-115189 A | 4/2005 |
| JP | 2013003746 A | 1/2013 |
| JP | 2014-229306 A | 12/2014 |
| JP | 2015-133221 A | 7/2015 |
| JP | 2016-40655 A | 3/2016 |
| JP | 5906363 B1 | 4/2016 |
| JP | 6093102 B1 | 3/2017 |
| JP | 2018-078044 A | 5/2018 |
| WO | 2006/089101 A2 | 8/2006 |
| WO | 2018/037453 A1 | 3/2018 |

OTHER PUBLICATIONS

Office Action dated Aug. 13, 2020, issued for the corresponding Korean patent application No. 10-2019-0044096 (Original and translation included).
Nagata, Kazuya. Instructional Text for IT Security, p. 74, Mynavi Publishing Corporation, Published on Jan. 25, 2016.
International Search Report and Written Opinion dated Sep. 13, 2016 for International Application No. PCT/JP2016/074379.
Supplementary European Search Report, dated Mar. 2, 2020, for European Patent Application Serial No. 16914128.0.

* cited by examiner

FIG. 6

Enter user ID to be registered — 401

USER ID — 402

ALREADY-REGISTERED USER ID

NONE

CANCEL — 404

NEXT — 403

FIG. 7

Enter secret information — 411

USER ID — 413 xxx@yyy.zzz.com

SECRET INFORMATION — 412

CANCEL — 404

NEXT — 403

AUTHENTICATION SYSTEM, AND INFORMATION RECORDING MEDIUM

PRIORITY CLAIM

This application is a national phase of PCT/JP2016/074379, filed on Aug. 22, 2016, the entire disclosure of which is incorporated by reference herein.

TECHNICAL FIELD

The present disclosure relates to an authentication system suitable for safely presenting, to a user, a key code to sign-in to a server from an access terminal using a token terminal, and a non-transitory computer readable information recording medium having stored therein a program that causes a computer to function as the token terminal, a management device, or the server.

BACKGROUND ART

Conventionally, technologies of presenting, to a user, a one-time password by software token have been proposed.

For example, Patent Literature 1 discloses a technology of:

(1) managing a token ID assigned to a security token by an authentication database;

(2) causing a synchronization server to create a token code from a seed that is a combination of the obtained token ID from the authentication database with a current clock time;

(3) causing an information communication terminal to create a token code from a seed that is the combination of the obtained token ID from the security token with the current clock time;

(4) executing an authentication based on whether or not the entered token code (password) by a user who is viewing the information communication terminal is consistent with the token code created by the synchronization server; and (5) making the token ID and further a user name and a user's mail address available as the seed.

In addition, Non Patent Literature 1 discloses a technology of:

(1) causing a user to install a dedicated application on a smartphone;

(2) transmitting, to a mail address when the user registers the mail address (user ID) in the dedicated application, a mail to confirm whether or not the mail address is valid;

(3) completing the registration of the mail address when the user enters the code described in the arrived mail into the dedicated application;

(4) transmitting, to an authentication platform, the registered mail address in the dedicated application when the user enters a collaboration code (server ID) assigned to a server in the dedicated application;

(5) causing the authentication platform to transmit a key code (password) for the server to the dedicated application upon checking the transmitted mail address from the dedicated application;

(6) causing the dedicated application to which the key code is transmitted to create a slot for the server; and (7) presenting, when the user taps the slot, within a random-number table, the key code in a manner embedded in the random-number table in accordance with the sequence and the position both defined by the user.

Conversely, many users set the same password for multiple services. Hence, when the set password by the user is revealed due to some reasons, intrusion to various services is enabled.

In addition, even if an attempt to cause the user to periodically update the password for authentication is made, such an update takes time for the user. Hence, the user often neglects the password update, or sets a simple password.

In view of such a circumstance, Patent Literature 2 discloses a technology of causing a reminder terminal to present a password in a manner embedded in a random-number table, enabling the user to obtain, by arranging selected elements, the password when the user selects the elements from the random-number table in accordance with the position and the sequence both defined by the user, transmitting the password and the user name from the reminder terminal to an access terminal by a proximity communication, and enabling the user to sign-in to a server (see, for example, paragraphs [0109] to [0116]).

CITATION LIST

Patent Literature

Patent Literature 1: Unexamined Japanese Patent Application Kokai Publication No. 2014-229306
Patent Literature 2: Japanese Patent No. 5906363

Non Patent Literature

Non Patent Literature 1: Kazuya NAGATA, Instructional Text for IT Security, pp. 74, Mynavi Publishing Corporation, Published on Jan. 25, 2016

SUMMARY OF INVENTION

Technical Problem

Therefore, strong demands for facilitating a setting of different passwords for respective services without causing a user to think out the password, periodically updating the password, and converting the password into a one-time password are present.

Conversely, in view of preventing the password, and the like, from being revealed, and of protecting the personal information, there are also demands for causing a server to hold the minimum requisite user information.

The present disclosure has been made to address the foregoing technical problems, and an objective is to provide an authentication system suitable for safely presenting, to a user, a key code to sign-in to a server from an access terminal using a token terminal, and a non-transitory computer readable information memory medium having stored therein a program that causes a computer to function as the token terminal, a management device, or the server.

Solution to Problem

An authentication system according to the present disclosure is for a server to determine whether or not to permit a sign-in to the server to which a site seed not opened to the public is assigned via an access terminal using a token terminal.

First, in the authentication system, in order to enable a user of the token terminal to register the server in the token terminal:

(a) the token terminal has specified access information to sign-in to the server, and transmits the specified access information to a management device;

(b) the management device applies a first function to at least the transmitted access information and the site seed assigned to the server, thereby obtaining a user seed with respect to the server, and transmits the obtained user seed to the token terminal; and (c) the token terminal records the transmitted user seed, thereby registering the server in the token terminal.

In addition, in the authentication system, in order to enable the user to attempt a sign-in to the server via the access terminal using the token terminal in which the server is registered:

(d) the token terminal obtains a share seed independently obtained from the server with respect to the attempted sign-in, and shared with the server, and applies a second function to at least the obtained share seed and the recorded user seed, thereby obtaining a key code, and presents the obtained key code to the user;

(e) the access terminal receives the presented key code by the token terminal to the user, and transmits, to the server, a request that specifies the received key code; and (f) the server receives the transmitted request, obtains access information relating to the received request, applies the first function to at least the obtained access information and the site seed assigned to the server, thereby obtaining a checkup seed, obtains a share seed independently obtained from the token terminal with respect to the attempted sign-in, and shared by the token terminal, applies the second function to at least the obtained shared seed and the obtained checkup seed, thereby obtaining a checkup code, and sets a necessary condition to permit the sign-in relating to the request via the access terminal in which the received key code and the obtained checkup code are consistent with each other.

In this case, the management device and the server may be accomplished by executing programs corresponding to the respective functions over different computers, or may be accomplished by executing a single program corresponding to both the functions over a single computer.

In addition, the token terminal and the access terminal may be accomplished by executing programs corresponding to the respective functions over different computers, or may be accomplished by executing a single program corresponding to both the functions over a single computer.

Advantageous Effects of Invention

According to the present disclosure, provided are an authentication system suitable for safely presenting, to a user, a key code to sign-in to a server from an access terminal using a token terminal, and a non-transitory computer readable information memory medium having stored therein a program that causes a computer to function as the token terminal, a management device, or the server.

BRIEF DESCRIPTION OF DRAWINGS

FIG. 6 is an explanatory diagram illustrating an example display scheme of a user ID entry form;

FIG. 7 is an explanatory diagram illustrating an example display scheme of a secret information entry form;

DESCRIPTION OF EMBODIMENTS

Embodiments of the present disclosure will be explained below. The embodiments are presented for explanation purposes, and are not intended to limit the scope of the present disclosure. Hence, a person skilled in the art could carry out an embodiment in which each component or all components are replaced with equivalents, and such an embodiment should also be within the scope of the present disclosure.

Basis Structure of Authentication System

Figure 1:
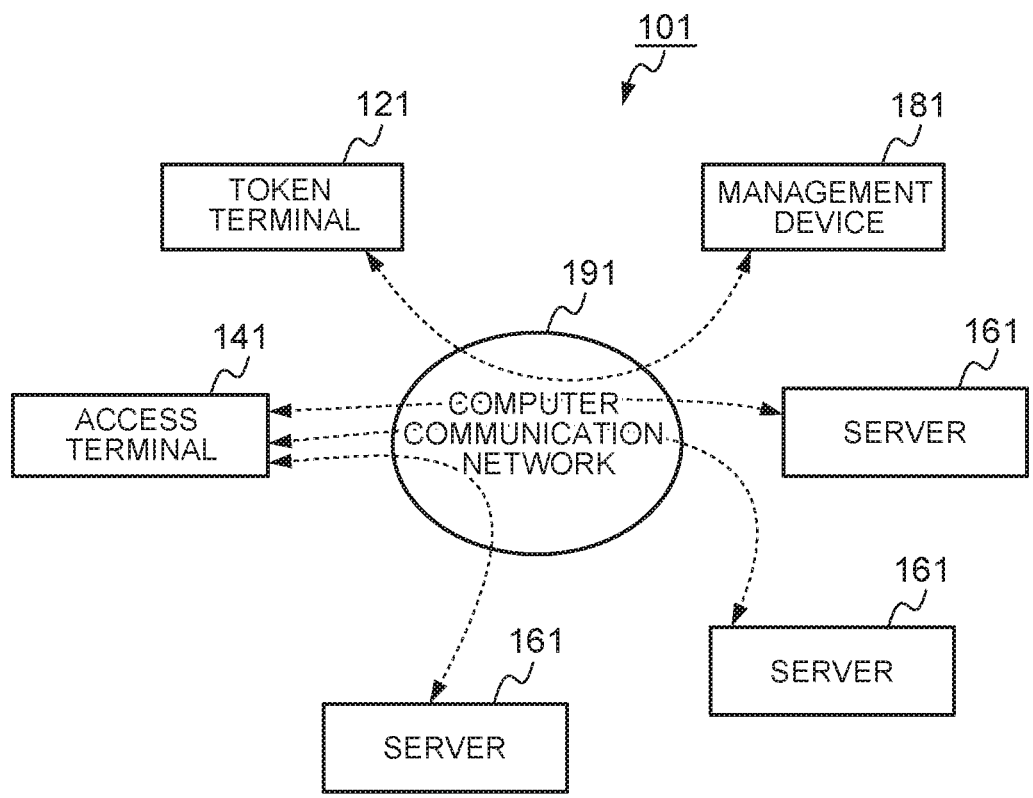
FIG. 1 is an explanatory diagram illustrating an outline of an authentication system according to an embodiment of the present disclosure.

FIG. 1 is an explanatory diagram illustrating an outline of an authentication system according to an embodiment of the present disclosure. The following explanation will be given with reference to this figure.

An authentication system 101 according to this embodiment includes a token terminal 121, an access terminal 141, servers 161, and a management device 181.

Typically, a single management device 181 is prepared for the multiple servers 161. However, each server 161 may also be configured to accomplish the function of the management device 181, and the independent management device 181 may be omitted in this case.

Typically, a portable information terminal, such as a smartphone or a phablet, is adopted as the token terminal 121, and a personal computer, a window-system terminal, or the like, is adopted as the access terminal 141. When, however, a program for the token terminal 121, and a program for the access terminal 141 are installed in a single computer in an executable manner, the token terminal 121 and the access terminal 141 can be integrally accomplished.

In addition, the token terminal 121 may be configured to accomplish the function of the management device 181, and the independent management device 181 may be omitted in this case, and the authentication system 101 may include the token terminal 121, the access terminal 141, and the server 161 in this case.

Those devices are communicable with each other via a computer communication network 191, such as the Internet, a mobile-phone communication network, or a wireless Local Area Network (LAN) like Wireless Fidelity (Wi-Fi). When the server 161 and the management device 181 are accomplished by respective independent devices, a dedicated communication line may be utilized between those devices. In addition, various encryptions may be made to the communication therebetween.

In the following explanation, a configuration in which information is exchanged between two components in the authentication system 101 by communication will be explained. In the configuration in which the two components are integrally accomplished by a single computer, modules for respective functions accomplished over such a computer may exchange those pieces of information via a memory, a register, a storage device, a recording medium, and the like, of the computer.

In this figure, a communication path utilized to register the server 161 in the token terminal 121, and a communication path utilized to sign-in to the server 161 from the access terminal 141 are indicated by bidirectional arrows with dots. Hence, once the operation starts, the communication between the management device 181 and the server 161, and the communication between the management device 181 and the access terminal 141 may be performed, but a feature of the present disclosure is that those communications are not required.

In addition, as will be explained later, the token terminal 121 and the access terminal 141 may exchange information via proximity communication like Bluetooth (Registered Trademark), or a local communication may be performed therebetween with those devices being connected to a common wireless LAN access point.

The token terminal 121 accomplishes a function of presenting, to the user, a key code (password) that enables the user to sign-in to each server 161. Typical token terminals 121 applicable are various mobile terminals, such as a mobile phone, a smartphone, a tablet, a Personal Data Assistant (PDA), and a wearable terminal.

As for how to present the key code, the scheme disclosed in Patent Literature 1 and letting only the user know, that is, a scheme that prevents a third person from immediately stealing the key code by only a furtive glance, or the key code may be presented directly.

The access terminal 141 is a terminal to enable the user to sign-in to the server 161 to utilize various resources of the server 161, and to utilize a service. Typically, the user accesses the server 161 via a browser or terminal software activated over the access terminal 141 in order to sign-in to the server 161. An example access terminal 141 available is an emulator terminal, such as various stationary computers or X-terminals. In addition, the access terminal 141 may also be selected from the various mobile terminals that may be used as the token terminal 121.

The server 161 provides various services like the utilization of resources to the user. The server 161 obtains, from the access terminal 141, the user ID and the key code both entered by the user via the access terminal 141, and authenticates whether or not the user has a utilization authority, thereby determining whether or not to allow the user to utilize the resources.

A server name is assigned to the server 161. The server name is expressed by the server identifier (ID) of the computer serving as the server 161, such as a host name, an Internet Protocol (IP) address, a domain name, or a Universal Resource Locator (URL) that will be a contact for providing the resources.

In addition, a site seed is allocated to the server 161 in accordance with the service to be provided. Each site seed is shared by the management device 181 that manages the server 161 to which the site seed is given, but is not opened to the public for the devices other than those, thus having a similar function to that of a so-called secret key.

The management device 181 intermediates the registration of, in the token terminal 121, information on sign-in to the server 161. In addition, the management device 181 checks whether or not the registered user ID in the token terminal 121 is valid.

According to this configuration, the user who utilizes the token terminal 121 and also the access terminal 141 may commonly use the single user ID, or may assign different user names to sign-in to the multiple servers 161. In addition, the user is capable of easily signing in to the server 161 without disclosing the user ID like the mail address utilized as main contact information to the server 161.

In response to the transmitted sign-in request from the access terminal 141 to the server 161, the server 161 determines whether or not to permit the sign-in, but various contents providing services provided by the server 161 may be made available from the access terminal 141 upon permission to the sign-in, a dialogue may be enabled by a shell program activated on the server 161 and a command line activated by a terminal program, and utilization of various resources managed by the server 161 (for example, opening and closing of an electronic lock, changing of an electronic switch, and transmission of a control command to an electrical product) may be enabled.

Association of User ID with Token Terminal

Figure 2:
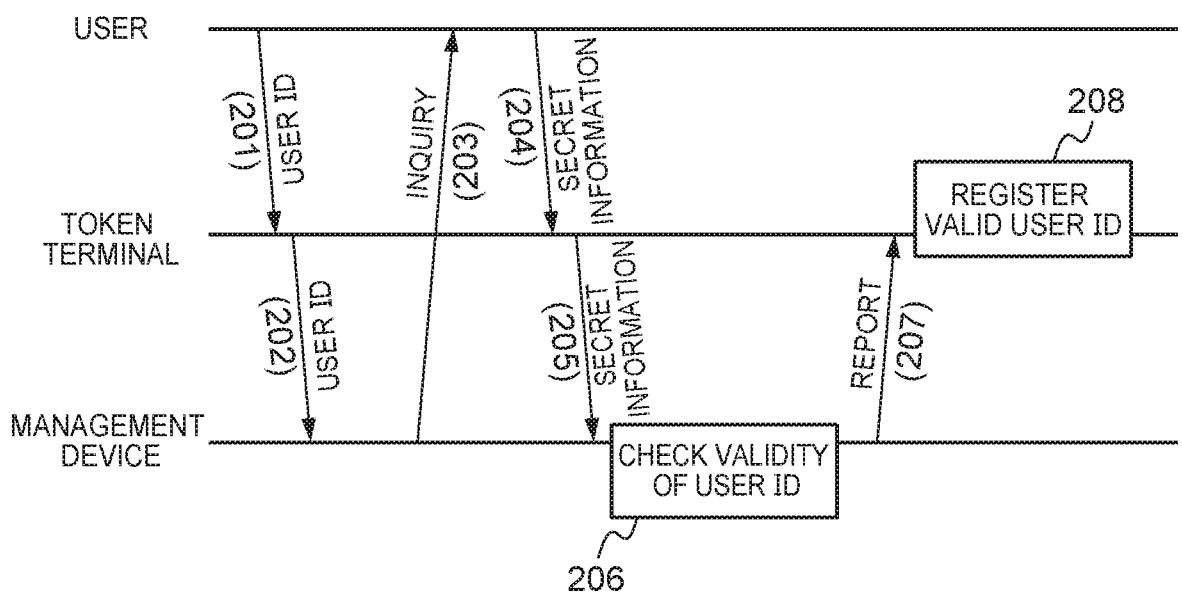
FIG. 2 is an explanatory diagram illustrating how information is exchanged in the authentication system according to the embodiment of the present disclosure when a user ID is associated.

FIG. 2 is an explanatory diagram illustrating how information is exchanged in the authentication system according to the embodiment of the present disclosure when the user ID is to be associated. The following explanation will be given with reference to this figure.

First, an explanation will be given of a procedure of causing the management device 181 to manage the token terminal 121, and associating the user's own user ID with the token terminal 121.

The user enters (201), in the token terminal 121, the user ID that the user wants to manage a sign-in at the token terminal 121. Example user IDs applicable are various address information that allows contact with the user, such as a mail address, a mobile phone number, a fixed-line phone number, a facsimile number, and a user name of a Social Network Service (SNS) or a chat system. A desirable user ID is information that is surely memorized by the user, and in many recent web services, a mail address of the user is often utilized as the user ID.

The entered user ID is transmitted (202) from the token terminal 121 to the management device 181.

In this case, the management device 181 transmits (203) an inquiry to the transmitted user ID. In this figure, although the inquiry is illustrated as being transmitted to the user, the destination of the inquiry message is selected as appropriate in accordance with the contact information adopted as the user ID, such as various mobile terminals, computers, telephones, and facsimile machines that serve as the token terminal 121 and the access terminal 141.

This inquiry desirably specifies secret information, such as a letter string, sounds, images, set at random by the management device 181. In addition, this secret information desirably has an expiration date with a certain length of time, such as several minutes, several hours, or several days. When the user enters (204), in the token terminal 121, the specified secret information in the inquiry, a reply that is specified by this secret information is transmitted (205) from the token terminal 121 to the management device 181.

Upon arrival of the reply that is specified by the proper secret information from the token terminal 121 within the expiration date after the inquiry, the management device 181 confirms that the entered user ID from the token terminal 121 is valid (206).

In this case, the management device 181 transmits (207), to the token terminal 121, a report that the user ID is associated with the token terminal 121. The token terminal 121 records (208) the user ID confirmed by the management device 181 as valid. Next, the user IDs already confirmed are made as selectable as the user ID when an attempt to sign-in to the server is made subsequently.

Registration of Server in Token Terminal

Figure 3:
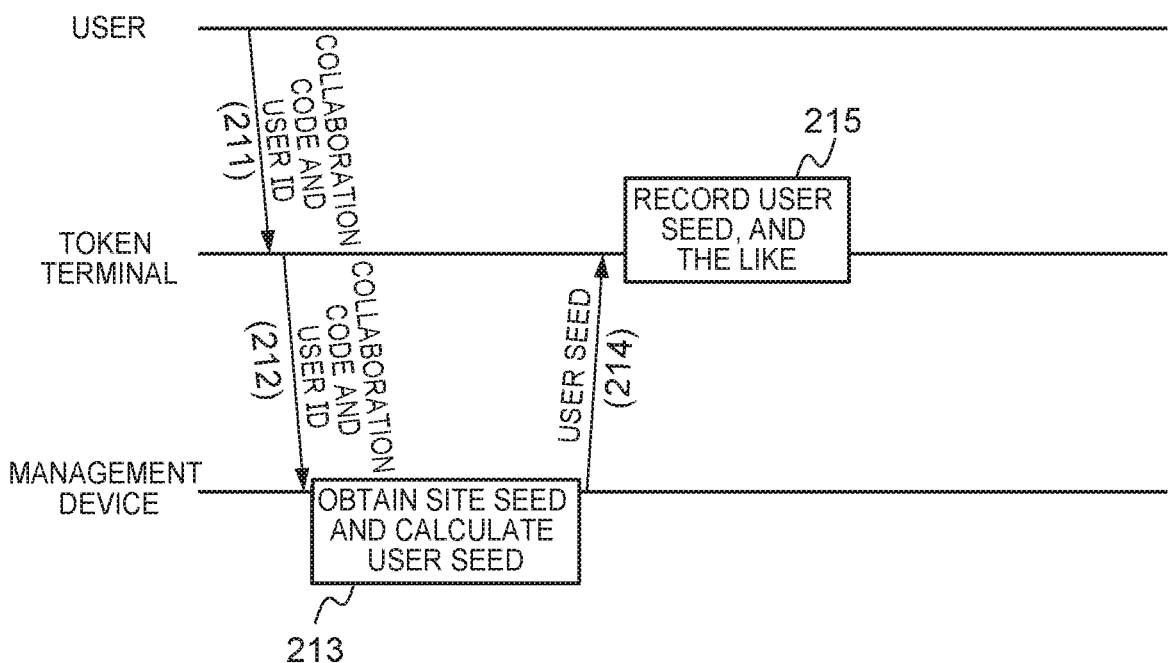
FIG. 3 is an explanatory diagram illustrating how information is exchanged in the authentication system according to the embodiment of the present disclosure when a server is registered in a token terminal.

An explanation will be given of a procedure of registering the server 161 in the token terminal 121 in order to enable the user to sign-in to the server 161. FIG. 3 is an explanatory diagram illustrating how information is exchanged in the authentication system according to the embodiment of the present disclosure when the server is registered in the token terminal.

The user enters (211), in the token terminal 121, the collaboration code assigned to the server 161, and access information to sign-in to the server 161. In the following explanation, in order to facilitate understanding, an explanation will be given of an example case in which the user ID to sign-in to the server 161 is utilized as the access information. Other available information as the access information will be explained later.

The collaboration code is also called a registration code, is an identification name to identify the server 161 and the service provided by the server 161, and is typically determined by a contract, or the like, between the operator of the server 161 and the operator of the management device 181. A different collaboration code is allocated for each service provided by the server 161.

By selecting any of the user IDs associated with the token terminal 121 in the above 201 to 207 as the user ID to sign-in to the server 161, this user ID may be taken as being entered. When the user enters a user ID that has not been associated with the token terminal 121 yet, prior to the following processes, the similar processes to those of 202 to 208 may be executed.

In this case, the token terminal 121 transmits (212) the collaboration code and a user ID (u) to the management device 181.

This causes the management device 181 to obtain, with respect to the transmitted collaboration code, a site seed (s) which is shared with the server 161 but is kept secret from other people. Next, a first function (F) that is shared between the management device 181 and each server 161 is applied to the transmitted user ID (u) and the obtained site seed (s), and thus a user seed (v) is obtained (213).

$$v=F(u,s)$$

As for the first function applied in this case, and a second function (H) to be explained later, a one-way function, a digest function, a hash function including a cryptographic hash function, and the like, are optionally applicable.

When the first function and the second function are applied to multiple parameters, the above one-way function, or the like, may be applied to a single parameter that is a collection of those multiple parameters. As for the collection of the parameters, processes, such as arranging the multiple parameters at a predetermined sequence and interconnecting those by a predetermined punctuator, interchanging some of or all of the contents of each parameter in a predetermined sequence, and adding a predetermined letter string (sometimes called "salt") to the header or the tail, may be executed.

The first function (F) is desirably not opened to the public for the token terminal 121 and to the access terminal 141. In addition, instead of the single first function that is shared between the management device 181 and each server 161, a different first function for each server 161 may be applied, or a different first function for each group (for example, a server group operated by group companies) of the servers 161 may be applied.

When the management device 181 transmits (214) the user seed (v) to the token terminal 121, the token terminal 121 records (215), in association with each other in the token terminal 121, the identification name (for example, the collaboration code, the server name, or the service name) of the server 161 and the user seed (v). Typically, the user ID (u) is recorded in the token terminal 121 in association with the identification name of the server 161, but may be simply memorized by the user alone.

Accordingly, a preparation for the sign-in to the one server 161 is now ready. Up to this procedure, at the server 161 side, any process like user registration is unnecessary at all. In addition, in the subsequent procedures, even if the token terminal 121 is in an off-line state that does not enable a communication or an interaction with the other device, a process of presenting the key code is still enabled.

Note that as will be explained later, when one or more user IDs have been already associated with the token terminal 121, the management device 181 may issue a new alias which will be the user ID to sign-in to the server 161. In this case, the entering of the user ID by the user (211) is omitted, and any user ID already associated with the token terminal 121 is transmitted (212) to the management device 181, an alias is issued relative to the transmitted user ID to the management device 181, and the user seed is calculated (213) based on this alias. Subsequently, the management device 181 transmits (214) the user seed and the alias, and the token terminal 121 records (215) the user seed and alias.

Sign-In to Server

As explained above, after the server 161 is registered in the token terminal 121, the user refers to the token terminal 121, enabling a sign-in to the server 161 via the access terminal 141.

What is applied to this sign-in is a share seed that is to be shared between the token terminal 121 utilized by the user who attempts to sign in and the server 161 for this sign-in attempt. The share seed is information expected as having the same value when utilized by a proper user. Typically, the token terminal 121 and the server 161 respectively obtain the share seed without a communication therebetween. That is, the share seed has characteristics which are independently obtained from each other without a need for communication or interaction between the token terminal 121 and the server 161, and which are to be consistent with each other. An example applicable share seed is as follows.

First, the user ID utilized to sign-in may be the share seed. As explained above, when the server 161 is registered in the token terminal 121, the user ID is also recorded in the token terminal 121, and thus the token terminal 121 obtains this user ID as the share seed. Conversely, when attempting to sign-in to the server 161, the user enters the user ID to the server 161 via the access terminal 141. Hence, the server 161 is capable of obtaining the share seed that is the entered user ID by the user.

Besides, a value that expresses the present date and hour at which the sign-in is being attempted by a predetermined unit is also applicable as the share seed. The token terminal 121 and the server 161 independently obtain the present date and hour at which the user is attempting the sign-in, and define the respective pieces of obtained information in the predetermined unit. Hence, the share seed that has the same value is obtainable.

Figure 4:
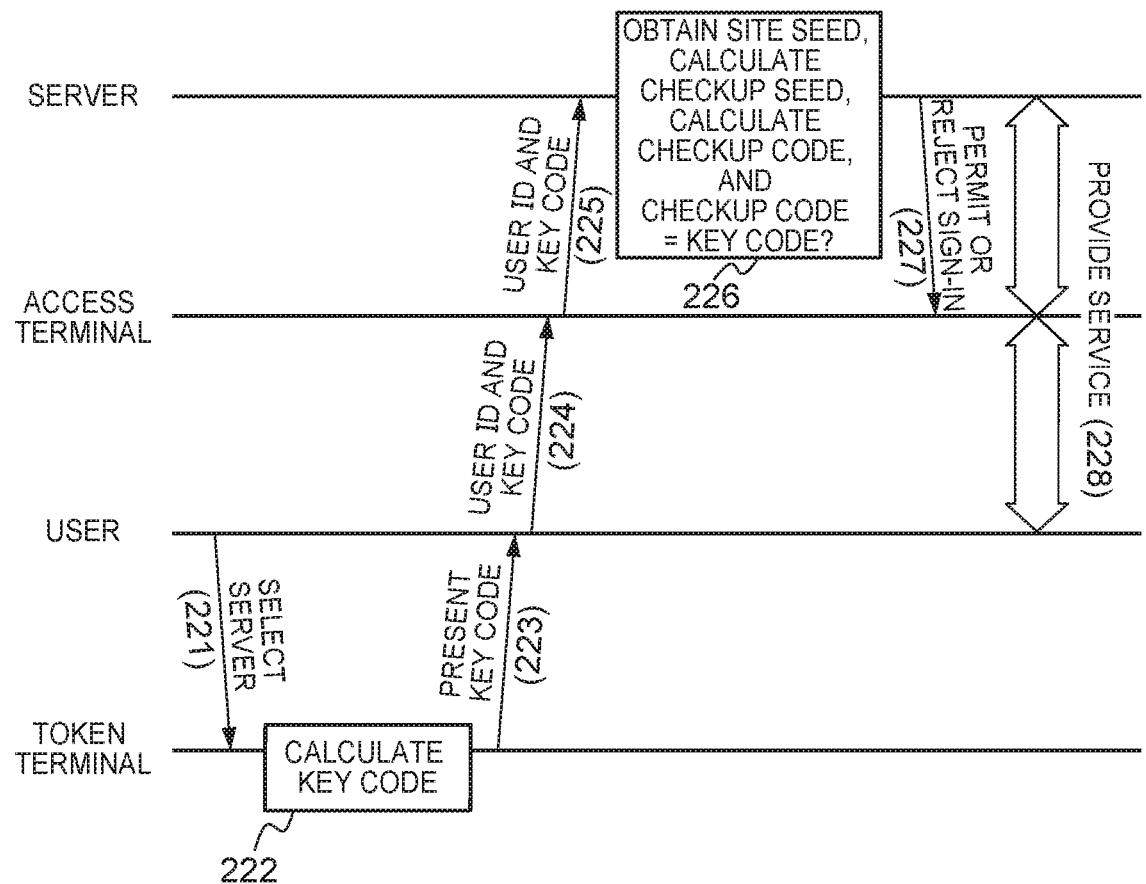
FIG. 4 is an explanatory diagram illustrating how information is exchanged in the authentication system according to the embodiment of the present disclosure when an attempt to sign-in to the server is made.

Other forms of the share seed will be explained later. In addition, a combination of the user ID with the present date and hour, and further the form to be explained later may be the share seed. In the following explanation, in order to facilitate understanding, an explanation will be given of a configuration in which the combination of the user ID with the present date and hour is utilized as the share seed. FIG. 4 is an explanatory diagram illustrating how information is exchanged in the authentication system according to the embodiment of the present disclosure when the user attempts to sign-in to the server.

First, the user selects (221) the identification name of the server (for example, the collaboration code, or the server ID) to which the user attempts to sign-in among the servers 161 already registered in the token terminal 121.

In this case, the token terminal 121 obtains the user ID (u) registered in association with the identification name of the selected server, the user seed (v), and a present date and hour (d) expressed in the predetermined unit, applies the second function (H) to those pieces of information, thereby obtaining (222) a key code (k).

$$k=H(u,v,d)=H(u,F(u,s),d)$$

Although the site seed (s) itself is unknown, the token terminal 121 obtains the user seed (v) when registering the server 161, thus capable of obtaining the key code (k) that has a dependency on the site seed (s).

Typically, the second function (H) is shared between each token terminal 121 in the authentication system 101 and each server 161 therein, but a different second function for each server 161 may be applied. When a different second function (H) for each server 161 is applied, the setting of this second function (H) may be registered beforehand in the management device 181, and the second function (H) to be applied may be provided from the management device 181 to the token terminal 121 when a slot for each server 161 is created.

In general, a cryptographic hash function desirably has characteristics such that:

(1) an estimation of a parameter to which the hash function is applied is difficult from the applied result of the hash function (pre-image resistance); and (2) an obtainment of the same result with respect to different parameters is quite rare, and finding such a parameter is difficult (second pre-image resistance, strong collision resistance).

Conversely, since the key code (k) that is a calculation result by the second function is a value to be entered by the user at the time of sign-in as will be explained later, and thus the key code should have a reasonable character string length (for example, four to eight digits in alphanumeric characters).

Hence, in the second function, the factors that are the second per-image resistance and the strong collision resistance should be eased to some level. For example, the second function that is "an arithmetic processing of obtaining a remainder obtained by dividing the obtained hash value from the cryptographic hash function by a predetermined constant" may be applied.

Conversely, in a calculation by the first function, the above cryptographic characteristics may be satisfied. For example, a hash value obtained by calculation may have a greater bit number than the bit number of information obtained by simply coupling pieces of information that are parameters. When, for example, the bite number of the hash value obtained by the application of the first function is increased by 1 bite (=8 bits), a space that needs an attacker to scan may be increased by 256 times.

In SHA-3 that is an example applicable first function and second function, a hash function (SHAKE128, SHAKE256, and the like) that has a variable bit number for the applied result is also applicable. Hence, an appropriate one-way function is desirably selected so as to accomplish an elongation beyond the bite length of the coupling length of the user ID, the site seed, and the date and hour.

In the case of the hash function like SHA-2, the output length is a fixed length like 512 bits. Hence, by preparing multiple hash functions that have an applied result which has a fixed length, applying such functions to original data, and coupling the applied results in a predetermined sequence, or interchanging the elements in accordance with a predetermined rule, the bit number of the applied result of the first function can be increased. In addition, after a predetermined different letter string (corresponding to the above salt) may be added to the header or tail of the original data, the one hash function, or the like, which has the applied result that has the fixed length may be applied to each information, and the obtained results may be coupled in a predetermined sequence, or the elements contained in the coupled result may be interchanged in accordance with the predetermined rule. Still further, those schemes may be combined together.

The token terminal 121 presents (223), to the user, the calculated key code (k). When, for example, different user IDs are utilized by the multiple servers 161, in order to provide information to be entered by the user when attempting to sign-in in an easy-to-understand manner, the token terminal 121 may further present the user ID (u) in use. In addition, when, for example, the single user ID is commonly applied to all servers 161 that have already been registered, and the user memorizes the user ID, the token terminal 121 may omit the presentation of the user ID (u).

The user enters (224), to a sign-in form displayed by the browser activated over the access terminal 141 and a log-in prompt given from the terminal software, the user ID (u) to sign in to the server 161, and the presented key code (k).

In this case, the access terminal 141 transmits (225) the entered user ID (u) and key code (k) to the server 161.

The server 161 that has received the user ID (u) and the key code (k) obtains a present date and hour (e) expressed in a predetermined unit, and calculates a checkup seed (w) and a checkup code (h) by the site seed (s), the first function (F), and the second function (H) set for the service provided by this server as follow.

$$w=F(u,s);$$

and $$h = H(u, w, d) = H(u, F(u, s), e)$$

When the user ID (u) is consistent with the site seed (s), the user seed (v) is consistent with the checkup seed (w) (v=w), and when the present date and hour (d) at the token terminal 121 is consistent with the present date and hour (e) at the server 161 in precision that is the predetermined unit, the key code (k) is also consistent with the checkup code (h) (k=h). Conversely, when the user ID, the site seed that is referred when the user seed is created, and both date and hour are inconsistent, a condition k≠h is satisfied.

Hence, the server 161 sets (226) a necessary condition for sign-in which is to compare the key code (k) with the checkup code, and which is the consistency of both codes, and notifies (227) the access terminal 141 of the permission or rejection of the sign-in. When the sign-in is successful, the service is provided (228) between the user and the server 161 via the access terminal 141.

In this case, the first function and the second function have the above cryptographic characteristics, and the user seed (v) differs for each user ID (u) and site seed (s). Hence, when a combination of the user ID (u) with the key code (k) at a given time point is revealed, or when an attacker refers to the information recorded in the prepared token terminal 121, an estimation of the site seed (s) and of the first function (F) is still difficult.

The server 161 becomes able to determine as to whether or not to permit the sign-in by the user, and to provide the service without managing the personal information other than the user ID of the user at all. Hence, according to this configuration, a "reveal of the password also shared by the user for other services" does not occur at all.

In addition, since contact enabled via the user ID is already confirmed by the management device 181 beforehand, the server 161 does not need an own validity check for the user ID. Hence, what the user needs to do beforehand with respect to sign-in to the server 161 is to simply enter the collaboration code from the token terminal 121, and to select the user ID to be utilized. Hence, a checking process by the server 161 and the necessary user effort are remarkably reduced.

The obtainment of the present date and hour and the application of the second function may be omitted. According to this configuration, an unchangeable password different for each server 161 can be easily distributed. In order to update the unchangeable password, upon setting a new site seed, the token terminal 121 may access the management device 181 for the user, and the management device 181 may prompt the user to register again the server or to change the user ID.

In addition, the unit of the present date and hour to which the second function is applied may be various time periods, such as a minute, an hour, a day, a week, a month, and a year. When this unit is made short, the similar effect to that of the conventional one-time password is obtainable, and when the unit is made long, a periodical password update is automatically performed, and thus the necessary user effort can be reduced.

In the above explanation, the access information that is the user ID (u) is adopted, and the first function (F) is applied to this access information and to the site seed (s) to calculate the user seed (v) and the checkup seed (w).

In this case, arbitrary information that satisfies the following conditions is applicable as the access information:

(1) obtainable by the server 161 from a sign-in request when the sign-in request is transmitted from the access terminal 141 to the server 161; and (2) enabling the user to manually enter beforehand in the token terminal 121 upon obtainment of the information from the access terminal 141 when the server 161 is registered in the token terminal 121, and the token terminal 121 to obtain from the access terminal 141 through pairing between the token terminal 121 and the access terminal 141.

As explained above, since the user ID (u) has been obtained by the user beforehand, the user can manually enter in the token terminal 121, and such information is entered by the user when the user attempts to sign-in to the server 161 via the access terminal 141, the user ID is available as the access information.

In addition, the terminal identification information on the access terminal 141 to which the sign-in request is transmitted may be adopted as the access information. For example, a Media Access Control (MAC) address assigned to the access terminal 141 to identify that access terminal when communicating with the server 161, an IP address (for example, global IPv4 address, IPv6 address), a host name, a domain name, a Fully Qualified Domain Name (FQDN), a ucode that is a ubiquitous identifier applied in the Internet of Things (IoT), and the like, may be adopted.

Still further, when a communication is performed based on a protocol that exchanges an electronic certificate between the access terminal 141 and the server 161, for example, a client certificate of the access terminal 141 may be adopted as the terminal identification information on the access terminal 141.

Those pieces of terminal identification information are different from the user ID specified by the user such that those pieces of terminal identification information are obtained from the access terminal 141 by the server 161 when a communication to transmit the sign-in request is established.

As explained above, when the terminal identification information that identifies the access terminal 141 is adopted as the access information, the user seed (v) and the checkup seed (w) also have a dependency on the terminal identification information. Hence, in the case of a sign-in via the access terminal 141 set when the server 161 is registered in the token terminal 121, the sign-in to the server 161 is enabled by using the presented key code from the token terminal 121.

When, however, the user attempts to sign-in to the server 161 via the other access terminal 141 rather than the above access terminal 141 using the presented key code from the token terminal 121, since the access information is inconsistent, the user seed (v) and the checkup seed (w) are also inconsistent with each other. Since the key code (k) and the checkup code (h) are inconsistent with each other, the sign-in request from the other access terminal 141 is rejected.

As explained above, according to this configuration, a remarkable effect is accomplished such that the access restriction that restricts the access terminal 141 is enabled but the server 161 does not need to prepare, in advance, a black list or a white list for the access terminal 141 available for a sign-in to the server 161.

Note that as for the access information, a combination of both the user ID and the terminal identification information on the access terminal 141 may be adopted, or either one of those pieces of information may be adopted. In various application fields, the user ID is desirably applicable to either one of or both of the access information and the share seed. According to the configuration in which only the sign-in from the specific access terminal 141 is permitted regardless of who the user is, the user ID may not be applied to both of the access information and the share seed.

As explained above, according to this configuration, a determination on whether or not the user and the access terminal 141 have a proper utilization authority without clearly giving the information on the user to the server 161. Hence, when the service like a public wireless LAN is to be provided under a captive portal circumstance, the present disclosure is suitable for managing the access terminal 141 capable of utilizing the public wireless LAN.

The short terminal identification information like a MAC address can be manually entered by the user, but the long terminal identification information, such as an electric certificate or a ucode, is often difficult for the user to manually enter. In such a case, the token terminal 121 and the access terminal 141 utilized by the user may be subjected to paring beforehand by a proximity communication or a local communication, and the terminal identification information on the access terminal 141 may be extracted by the token terminal 121, and may be registered therein. The user may select the access terminal 141 to sign-in when registering the server 161 in the token terminal 121, or the user seed may be obtained for each access terminal 141 registered in the token terminal 121, and may be stored in the token terminal 121.

According to this configuration, when the user selects the access terminal 141 and the server 161 to sign-in via the selected access terminal 141, the key code to be utilized is presented to the user.

Note that the configuration in which the terminal identification information on the access terminal 141 is adopted as the access information is also suitable for a case in which the token terminal 121 accomplishes the function of the management device 181.

An explanation will now be given of the process by each device, and a function that can be added to the above basic structure in detail. The following explanation will be given of an example case in which the user ID and the present date and hour are utilized as the share seed, while the user ID is utilized as the access information, but configurations in which the above various pieces of information are utilized as the share seed and the access information are also within the scope of the present disclosure.

Use ID Association Process

A process of associating the user ID with the token terminal 121 is executed when, for example, a program that causes a smartphone, or the like, to function as the token terminal 121 is initially executed by the smartphone, or when the user of the token terminal 121 wants to add a new user ID like a new mail address in the token terminal 121. Hence, an association of the one user ID is not necessary every time the server to which a sign-in attempt is to be made is added, and can be accomplished only once as a whole for the one token terminal 121.

Figure 5:
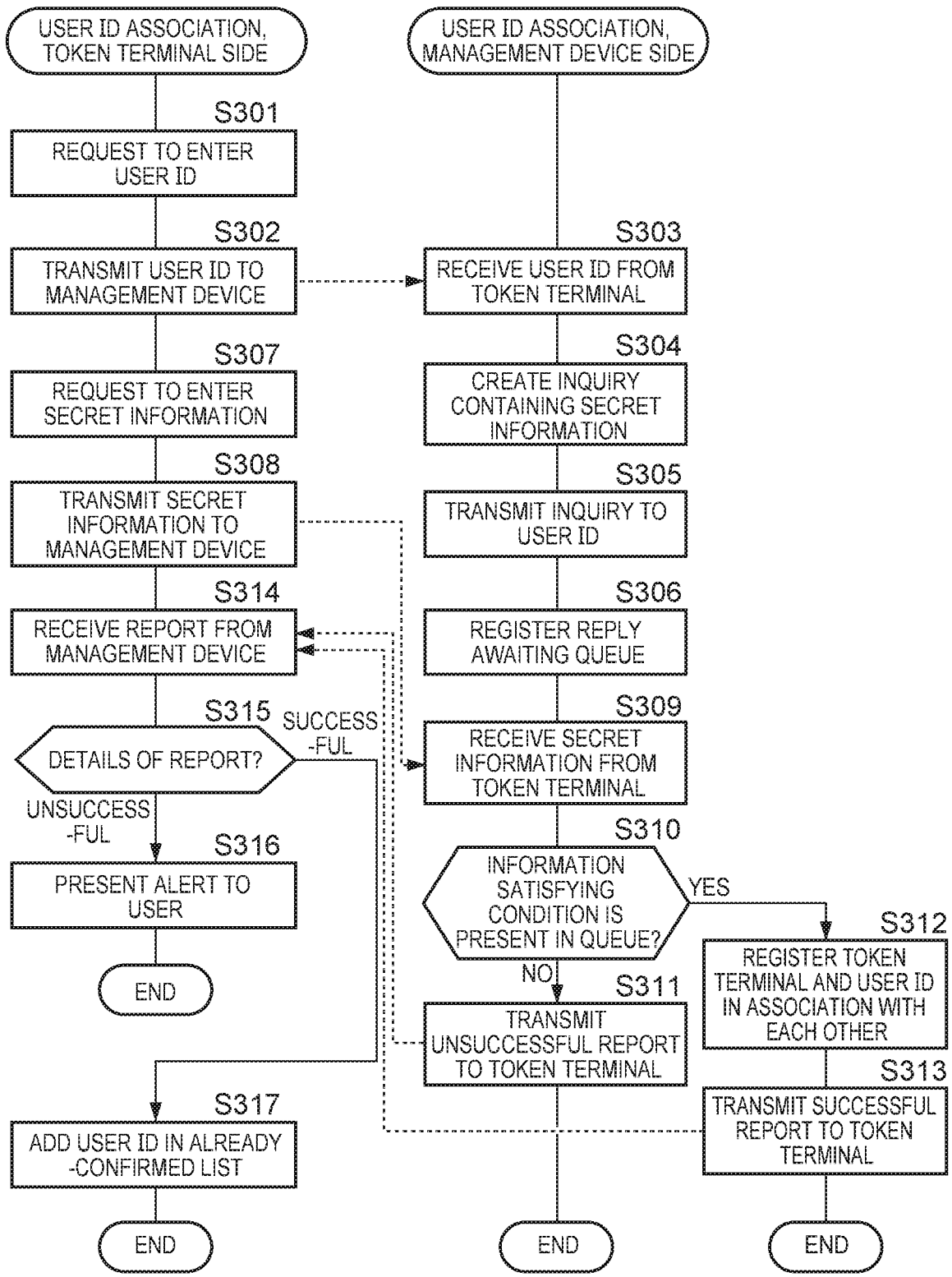
FIG. 5 is a flowchart illustrating a control flow in a user ID association process according to the embodiment of the present disclosure.

FIG. 5 is a flowchart illustrating a control flow in the user ID association process according to the embodiment of the present disclosure. The following explanation will be given with reference to this figure.

When this process starts, the token terminal 121 requests (step S301) the user to enter the user ID that the user wants to use.

FIG. 6 is an explanatory diagram illustrating an example display scheme of a user ID entry form. The user enters, to a user ID entry field 402 in a user ID entry form 401 displayed on the screen of the token terminal 121, the desired user ID, and clicks ("click" includes processes, such as to touch and press an object like a button on a touch screen, and processes, such as to select the object like the button by a keyboard or a mouse) a "next" button 403.

When the user wants to suspend the process, the user may click a "cancel" button 404 (the same is true of the following processes). The control flow when the "cancel" button 404 is clicked and the process is suspended is not illustrated in this figure in order to facilitate understanding.

When the user ID is entered, the token terminal 121 transmits (step S302) the entered user ID to the management device 181.

When receiving (step S303) the transmitted user ID from the token terminal 121, the management device 181 creates (step S304) an inquiry associated with the identification name of the transmission originator token terminal 121 and the transmitted user ID. As explained above, this inquiry specifies the secret information, such as a letter string, sounds, and images set at random. As will be explained later, this secret information is entered by the user from the token terminal 121 later.

Next, the created inquiry is transmitted (step S305) to the user ID, and the user ID, the identification name of the token terminal 121, and the secret information relating to the inquiry are associated with one another, and registered (step S306) in a reply awaiting queue. Each piece of secret information is eliminated (unillustrated) from the reply awaiting queue when a predetermined valid time period has elapsed after being registered in the reply awaiting queue. In addition, the desirable number of secret information that can be contained in the reply awaiting queue in association with the identification name of the one use ID and the one token terminal 121 is one. When there is redundant secret information, an update by the newer information is desirable.

According to the configuration in which the user ID is a mail address, the inquiry is transmitted in the form of an electronic mail to this mail address. According to the configuration in which a mobile phone number is adopted, the inquiry is transmitted in the form of a short message or a phone call by a voice message.

According to the configuration in which the facsimile number is adopted, the inquiry is transmitted by facsimile. According to the configuration in which the account name of various SNSs is adopted, the inquiry is transmitted in the form of, for example, a text chat, a voice chat, or a direct message in such SNSs.

When a smartphone is applied as the token terminal 121, this smartphone enables the user to receive an electronic mail, receive a short message, listen to a voice message by phone call, access to the SNS, and the like. In this case, the above inquiry is transmitted to the token terminal 121.

In addition, when no inquiry is transmitted to the hardware resource itself of the token terminal 121, the user of the token terminal 121 may receive the inquiry via any device, such as a facsimile machine or a fixed-line phone.

After step S302, the token terminal 121 requests (step S307) the user to enter the secret information specified in the transmitted inquiry. The token terminal 121 may interchange the sequence of processes, such as to transmit (step S302) the user ID to the server 161 after requesting (step S307) the user to enter the secret information.

FIG. 7 is an explanatory diagram illustrating an example display scheme of a secret information entry form. The user enters the secret information specified in the transmitted inquiry in a secret information entry field 412 of a secret information entry form 411 displayed on the screen of the token terminal 121, and clicks the "next" button 403. A user ID display field 413 displays the user ID entered in the user ID entry form 401.

In this case, the token terminal 121 transmits (step S308), to the management device 181, a reply that specifies the secret information entered in step S307, and the user ID entered in step S301.

The management device 181 receives (step S309) the transmitted reply, and checks (step S310) whether or not there is, in the reply awaiting queue, the secret information registered in association with the identification name of the token terminal 121 that is the transmission originator of the reply and the user ID specified in the reply, and further whether or not the registered secret information and the secret information specified in the reply are consistent with each other. When there is no secret information that satisfies such conditions (step S310: NO), the management device transmits (step S311), to the token terminal, a report that an association of the user ID is unsuccessful.

Conversely, when there is secret information that satisfies the above conditions (step S310: YES), the management device 181 records (step S312), in association with each other, the identification name of the token terminal 121 that is the transmission originator of the reply, and the user ID specified in the reply. When the identification name of the token terminal 121 and the user ID are recorded in the management device 181 in association with each other, this clarifies that the user ID has already been confirmed as valid for the token terminal 121.

Next, the management device 181 transmits (step S313), to the token terminal 121, a report that the validity of the user ID has been confirmed and the association with the token terminal 121 is successful.

The token terminal 121 receives (step S314) the transmitted report, and when the report shows that the association is unsuccessful (step S315: unsuccessful), the token terminal presents (step S316) an alert to that effect to the user, and ends this process. When the user attempts again to specify the user ID, the process subsequent to step S301 is repeated.

Conversely, when the report shows that the validity of the user ID is confirmed, and the association with the token terminal 121 is successful (step S315: successful), in the token terminal 121, the user ID is added (step S317) to the list of user IDs that have the confirmed validity, and the token terminal ends this process.

In practice, the management device 181 is repeating the process of considering the details of various packets received from the exterior, and executing a process in accordance with the considered details. In the figure, processes with a dependency in such repeating are extracted, and steps S303 to S306, and steps S309 to S313 are illustrated in a time-series sequence.

The above explanation has been given of a typical example of the user ID validity confirmation and the association with the user of the token terminal 121, but other conventionally well-known schemes based on mailing of a letter, or an interview between the manager of the management device 181 and the user, and the like, are also applicable.

In addition, a configuration in which the manager registers the association with the user ID in the management device 181 and the token terminal 121, and then passes the registered token terminal 121 to the user is also adopted.

Server Registration Process

Figure 8:
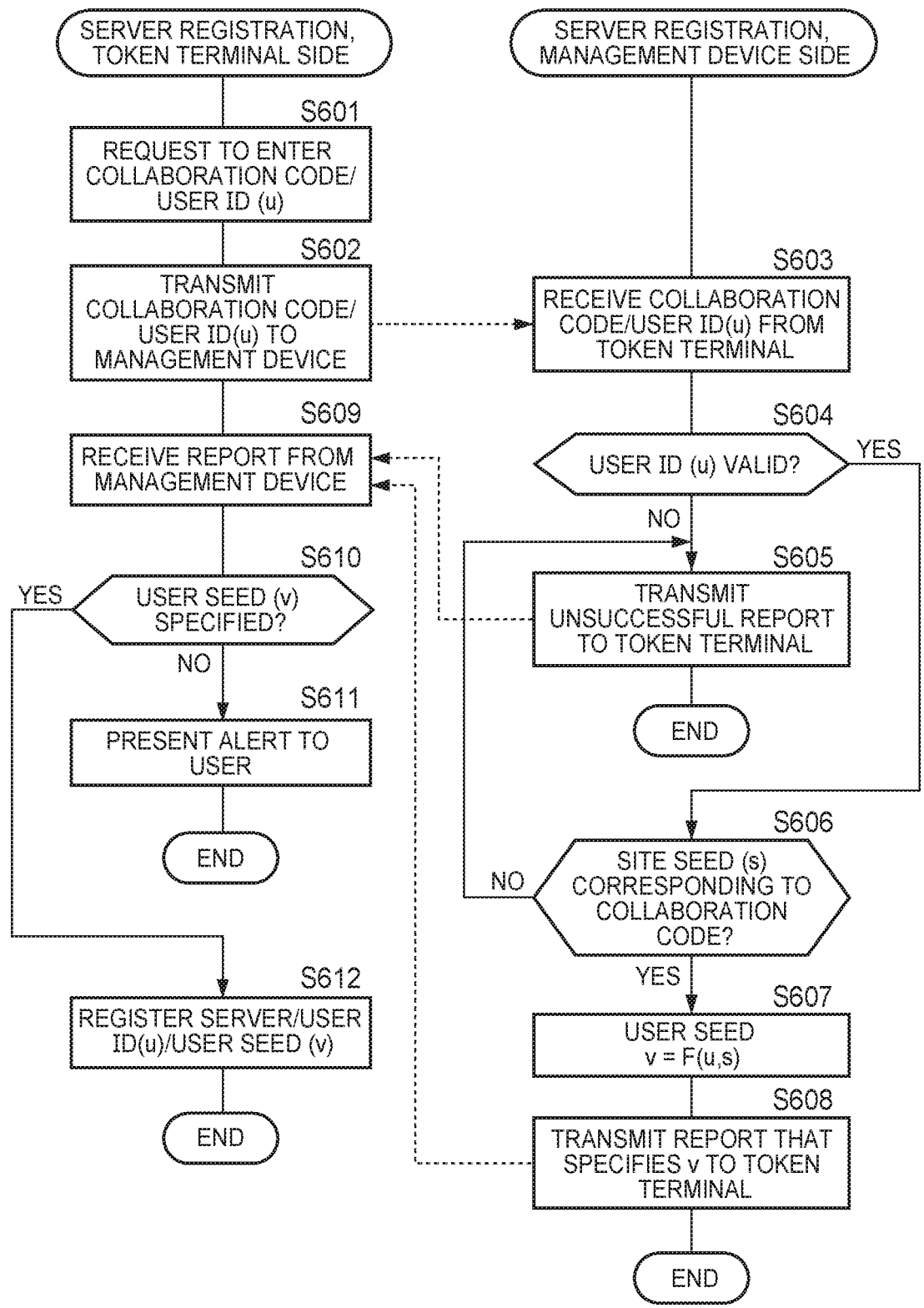
FIG. 8 is a flowchart illustrating a control flow in a server registration process according to the embodiment of the present disclosure.

The process of registering the server in the token terminal 121 is executed after the program that causes a smartphone, or the like, to function as the token terminal 121 is executed, and the user of the token terminal 121 selects a predetermined button, menu, and the like. FIG. 8 is a flowchart illustrating a control flow in a server registration process according to the embodiment of the present disclosure. The following explanation will be given with reference to this figure.

When this process starts, the token terminal 121 requests (step S601) the user to enter the collaboration code of the server which provides the service that the user wants to utilize in the future, and the user ID that the user wants to use for this server.

Figure 9:
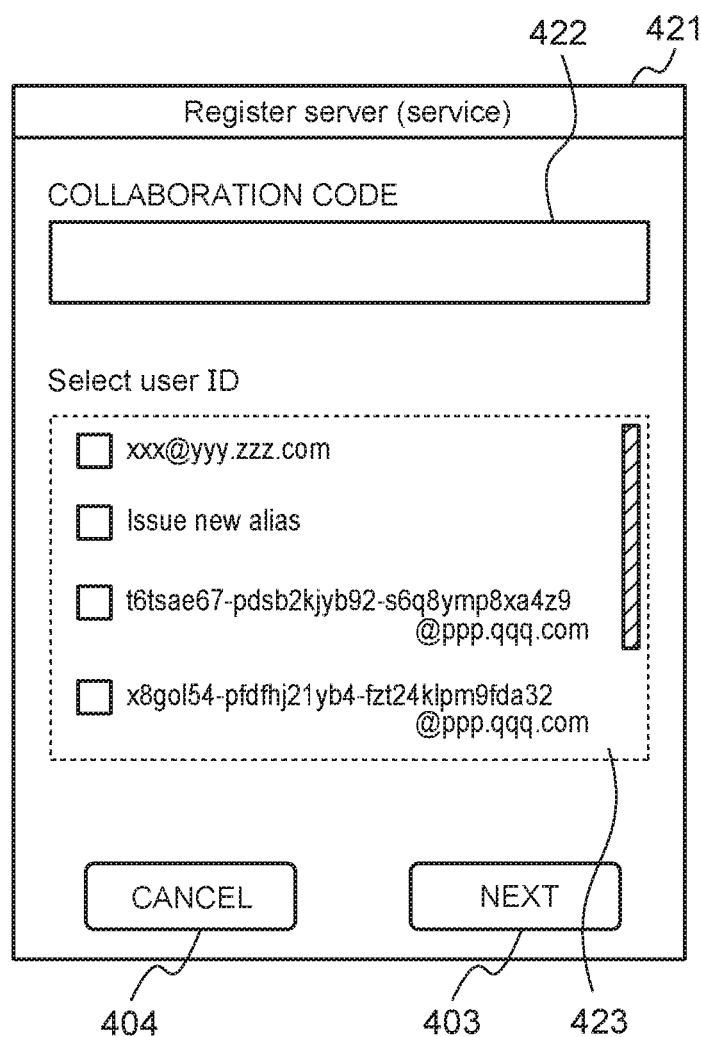
FIG. 9 is an explanatory diagram illustrating an example display scheme of a collaboration code entry form.

FIG. 9 is an explanatory diagram illustrating an example display scheme of a collaboration code entry form. The user enters a desirable collaboration code in a collaboration code entry field 422 in a server registration form 421 displayed on the screen of the token terminal 121. A user ID list 423 lists the user IDs that have the validity already confirmed between the management device 181 and the token terminal 121. Hence, the user checks and selects one of those user IDs. Next, the user clicks the "next" button 403.

A free entry field (unillustrated) for the user ID may be provided. When the user ID that is not listed on the user ID list 423 is entered in the free entry field, prior to the following process, the above user ID association process (step S301, and the like) may be executed in advance.

In this case, the token terminal 121 transmits (step S602), to the management device 181, the entered collaboration code and the selected user ID (u).

The management device 181 receives (step S603) the transmitted collaboration code and the user ID (u). Next, the management device checks (step S604) whether or not the identification name of the transmission originator token terminal 121 and the transmitted user ID (u) are recorded in association with each other, that is, whether or not the validity of the user ID (u) for this token terminal 121 has been checked.

When the validity has not been checked (step S604: NO), a report that the registration of the server is unsuccessful is transmitted (step S605) to the token terminal 121.

Conversely, when the user ID (u) has been checked as valid for the token terminal 121 (step S604: YES), the management device 181 attempts (step S606) to obtain the site seed associated with the collaboration code.

When there is no site seed (step S606: NO), the management device 181 progresses the process to step S605, and transmits, to the token terminal 121, a report to the effect that the registration of the server is unsuccessful.

Conversely, when there is the site seed associated with the collaboration code (step S606: YES), the management device 181 applies the first function (F) to the transmitted user ID (u) and the obtained site seed (s), thereby calculating (step S607) the user seed (v).

$$v=F(u,s)$$

Next, the management device 181 transmits (step S608), to the token terminal 121, a report that specifies the calculated user seed (v).

The token terminal 121 receives (step S609) the transmitted report from the management device 181, and when this report does not specify the user seed (v) (step S610: NO), the token terminal presents (step S611), to the user, an alert that the user ID or the collaboration code is invalid, and ends this process. When the user attempts again to register the server, the processes subsequent to step S601 are repeated.

Conversely, when the report specifies the user seed (v) (step S610: YES), this report indicates that the registration of the server is successful, and thus the token terminal 121 records (step S612) the collaboration code (or may be a service name, a server name, an icon, or the like, associated with the collaboration code beforehand), the selected user ID by the user, and the transmitted user seed (v) from the management device 181 in association with one another, and ends this process.

In order to facilitate understanding, the following explanation will be given of an example case in which multiple "empty slots" are prepared beforehand in the token terminal 121, and every time an association among the collaboration code, or the like, the user ID, and the user seed is registered, those pieces of information are embedded in a given "empty slot", and the user ID and the user code to be utilized for the service of the server 161 and the sign-in thereto are identified by the "slot" in which those pieces of information are embedded.

Sign-In Process

Figure 10:
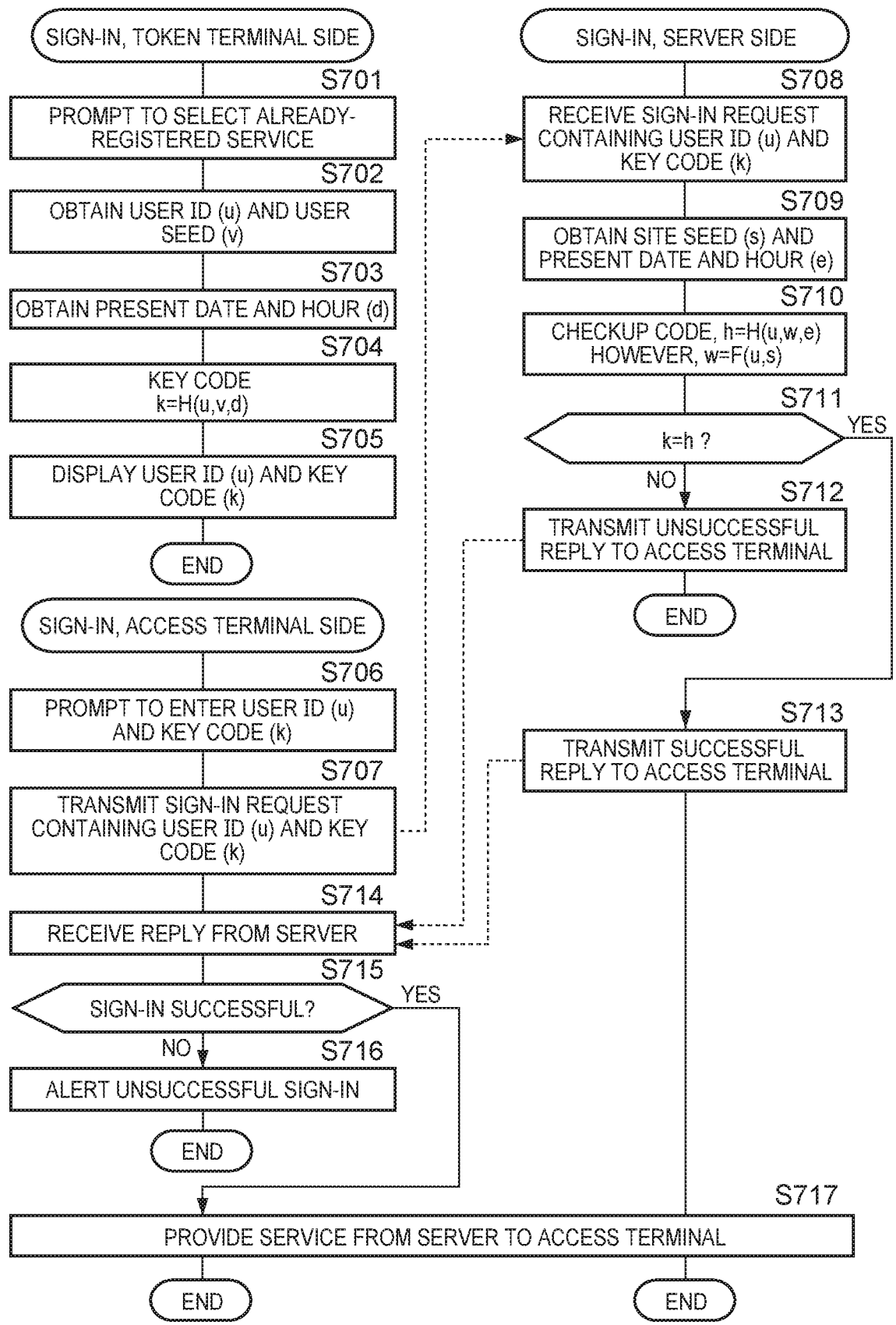
FIG. 10 is a flowchart illustrating a control flow in a sign-in process.

In this embodiment, as explained above, by simply registering the server 161 in the token terminal 121 via the collaboration code, the key code (password) necessary for the user to sign-in to the server 161 can be distributed. FIG. 10 is a flowchart illustrating a control flow in a sign-in process.

As explained above, as for the sign-in to the server 161, the access terminal 141 different from the token terminal 121 may be utilized, or the token terminal 121 and the access terminal 141 may be accomplished by a single computer. In the following explanation, in order to facilitate understanding, an expected situation in which the token terminal 121 and the access terminal 141 are different devices will be explained.

When the user selects a menu item or a button associated with the sign-in process at the token terminal 121, the token terminal 121 starts executing this process. Next, the token terminal 121 prompts (step S701) the user to select the service of the server 161 that the user wants to sign-in.

Figure 11:
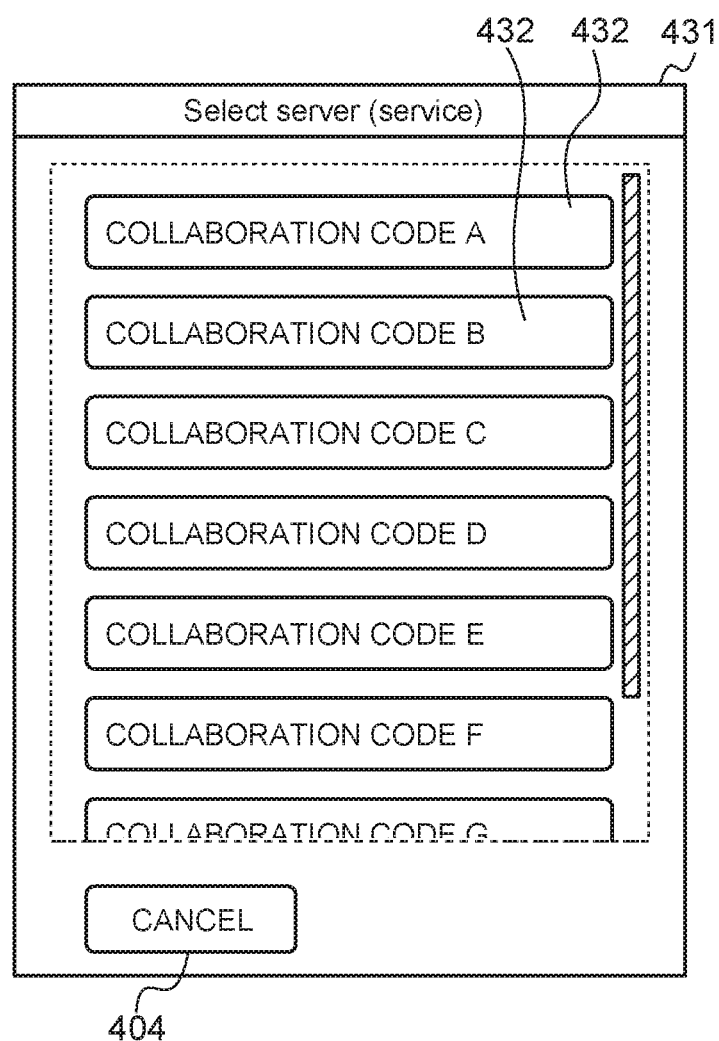
FIG. 11 is an explanatory diagram illustrating an example display scheme of a service selection form.

FIG. 11 is an explanatory diagram illustrating an example display scheme of a service selection form. As illustrated in this figure, a service selection form 431 is displayed on the screen of the token terminal 121. The service selection form 431 shows multiple slot buttons 432 that represent the slots having undergone the registration, and each slot button 432 is labeled with a name of the service (for example, the collaboration code is applicable).

When the user clicks the slot button 432 corresponding to the desired service, the slot associated with this slot button 432 is to be selected. In this case, the token terminal 121 obtains (step S702) the user ID (u) and the user seed (v) both recorded for the selected slot.

In addition, since the key code (password) changes in accordance with the date and hour, the token terminal 121 obtains (step S703) the present date and hour (d) in the predetermined unit.

Next, the token terminal 121 applies the second function (H) to the obtained user ID (u), user seed (v), and present date and hour (d), thereby calculating (step S704) the key code (k).

$$k = H(u, v, d)$$

In addition, the token terminal 121 displays (step S705) the user ID (u) and the calculated key code (k) on the screen.

Figure 12:
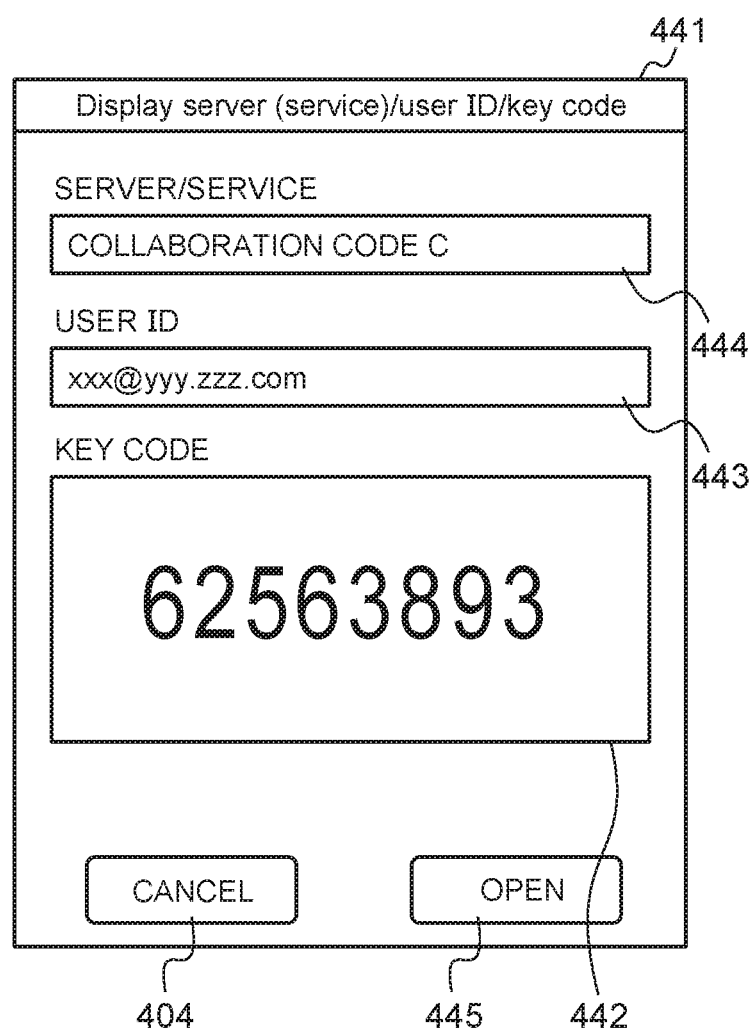
FIG. 12 is an explanatory diagram illustrating an example case in which a key code is directly displayed.

FIG. 12 is an explanatory diagram illustrating a case in which the key code is directly displayed.

In this figure, eight digit numbers "62563893" are displayed at a key code field 442 of a key code form 441. This is the key code utilized to sign-in, and when the key code is adopted with reference to the present date and hour (d), this key code functions as a one-time password or a password automatically updated per a predetermined unit of time period.

In addition, as illustrated in this figure, the user ID (u) that is "xxx@yyy.zzz.com" is displayed at a user ID field 443. This is the user ID utilized to sign-in. In addition, a server field 444 displays "collaboration code C" that is the identification name of the service. When the user ID (u) is simply memorized by the user, the display of the key code form 441, and those of the user ID field 443 and the user ID (u) in step S705 can be omitted.

Figure 13:
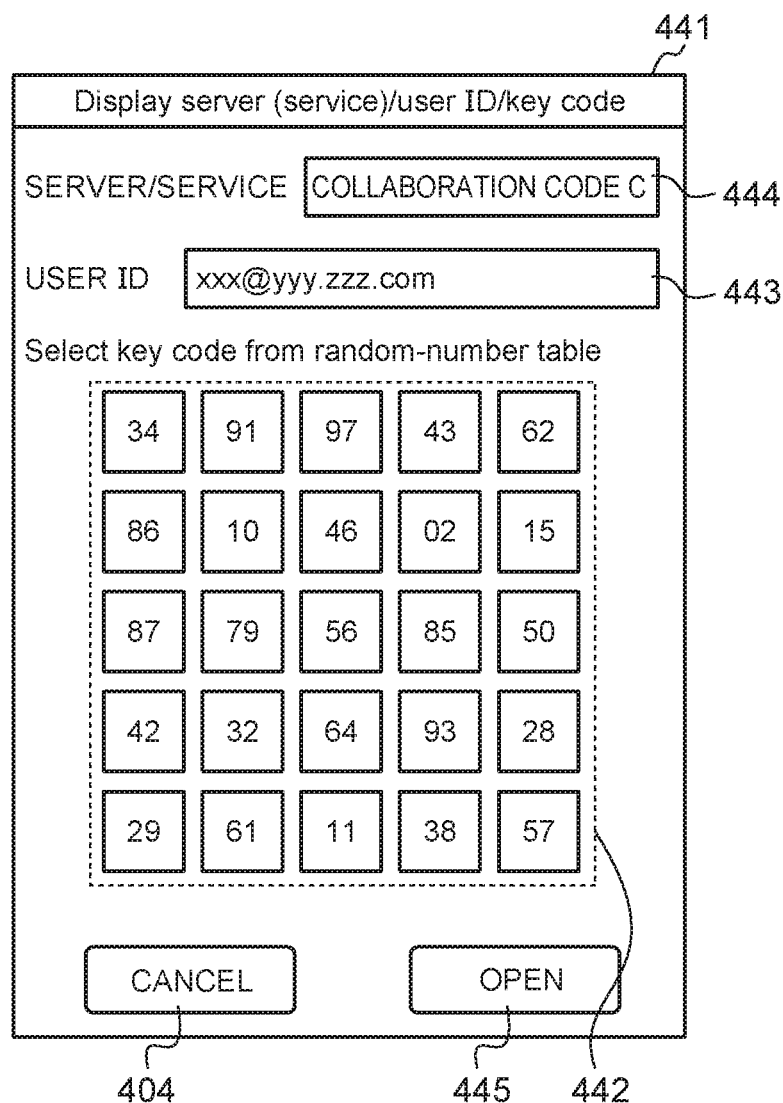
FIG. 13 is an explanatory diagram illustrating an example case in which the key code is displayed in a manner embedded in a random-number table.

FIG. 13 is an explanatory diagram illustrating an example display scheme of the key code embedded in a random-number table. In this figure, a random-number table is displayed at the key code field 442. The key code "62563893" is stored in a manner divided into pieces that are a one-by-five array piece, a three-by-three array piece, a five-by-four array piece, and four-by-four array piece. The position and the sequence are set by the user beforehand who utilizes the token terminal 121, and are for a so-called I-know authentication by the user who memorizes those pieces of information instead of the individual password.

Like the technology disclosed in Non Patent Literature 1, the user selects, from the random-number table, the grid at the position set by the user in accordance with a sequence set by the user, and interconnects the embedded elements in the selected grids, thereby obtaining the key code.

Note that the displayed key code form 441 is desirably and automatically dissipated when a certain time period (typically, several ten seconds to several minutes) has elapsed. In addition, the displayed key code form 441 may be erased when the user clicks the "cancel" button 404 in the key code form 441.

The user who is viewing the key code form 441 displayed on the screen of the token terminal 121 attempts to, via the browser activated over the access terminal 141, access the service to be signed in, or to access the server 161 to be signed in via the terminal software activated over the access terminal 141. In this case, the access terminal 141 displays a sign-in form or a log-in prompt based on the instruction from the server 161.

That is, the access terminal 141 prompts (step S706) the user to enter, in the sign-in form or in the log-in prompt, the displayed user ID (u) and key code (k) on the key code form 441. In the above example display scheme, the user enters "xxx@yyy.zzz.com" as the user ID (u), and "62563893" as the key code (k).

When the user enters those pieces of information, the access terminal 141 transmits (step S707), to the server 161, the sign-in request that specifies the entered user ID (u) and key code (k).

The entry of the user ID (u) and the key code (k), and the transmission thereof may be performed separately. For example, a configuration may be employed in which, in the case of the log-in prompt by the terminal software, first, a user ID enter prompt is displayed, and when the user enters the user ID in response to this prompt, information is immediately transmitted to the server 161. Subsequently, a key code (password) enter prompt is displayed, and when the user enters the key code in response to this prompt, information is immediately transmitted to the server 161.

According to this configuration, also, the user ID (u) and the key code (k) for sign-in are still transmitted from the access terminal 141 to the server 161.

When the server 161 receives (step S708) the user ID (u) and the key code (k) from the access terminal 141 with respect to the sign-in request, the server obtains (step S709) the site seed (s) set for the service to be provided, and the present date and hour (e) expressed in a predetermined unit, applies the first function (F) and the second function (H) to the received user ID (u), the obtained site seed (s), and the present date and hour (d), thereby calculating (step S710) the checkup seed (w) and the checkup code (h).

$$w=F(u,s);$$

and $$h=H(u,w,e)$$

Next, the server 161 checks (step S711) whether or not the received key code (k) and the calculated checkup code (h) are consistent with each other.

When both codes are not consistent with each other (step S711: NO), a reply to the effect that the sign-in is unsuccessful is transmitted (step S712) to the access terminal 141.

Conversely, when both codes are consistent with each other (step S711: YES), a reply to the effect that the sign-in is successful is transmitted (step S713) to the access terminal 141.

The access terminal 141 receives (step S714) the transmitted reply from the server 161. Whether or not the sign-in is successful can be distinguished based on whether the reply is the successful reply or the unsuccessful reply. When the sign-in is unsuccessful (step S715: NO), an alert such that the user ID or the key code is not proper, or the sign-in is unsuccessful because the expiration date of the key code has elapsed is made (step S716), and the access terminal ends the process. When the user attempts again the sign-in, the processes subsequent to step S701 are repeated.

Conversely, when the sign-in is successful (step S715: YES), the service is provided (step S717) between the access terminal 141 and the server 161.

As explained above, according to this embodiment, as for the registration of the server 161 in the token terminal 121, the user ID that has the validity checked beforehand is utilized, but as for the token terminal 121, a communication with the management device 181 is sufficient, and a communication and an interaction between the token terminal 121 and the server 161 are unnecessary.

In addition, according to this embodiment, entering of various kinds of new personal information is unnecessary. Still further, according to this embodiment, the user does not need to think out a password which is redundantly applied to other services, and which is not easily forgettable. When, for example, this configuration is applied to a free trial membership registration, the user can easily make a registration for the service as a trial.

Conversely, since the service provider is capable of obtaining the user ID that allows contact the user, the subsequent promotion can be made effectively.

When the token terminal 121 itself functions as the access terminal 141, the token terminal 121 may additionally have an automatic sign-in function.

That is, as illustrated in FIG. 12, the token terminal 121 provides an "open" button 445, or the like, in the key code form 441.

When the user clicks this button, the token terminal 121 activates the browser, the terminal software, or the like, in the token terminal 121, and starts accessing the server relating to the selected slot via the browser, or the like. Next, the token terminal 121 executes a process of automatically entering, in the browser, the terminal software, or the like, the sign-in information, such as the user name and the key code.

In the key code form 441 illustrated in FIG. 13, when the user clicks the element in accordance with the sequence and the position set by the user from the random-number table, the token terminal 121 sets the arranged contents of the clicked elements as the key code. Next, like the case in which the "open" button 445 is clicked in FIG. 12, the automatic entering process is executed.

In addition, a browser plug-in disclosed in Patent Literature 2 may be provided, a proximity communication between the token terminal 121 and the access terminal 141 may be performed to transmit the user name and the key code from the token terminal 121 to the access terminal 141, and the user name and the key code may be automatically entered by the browser of the access terminal 141.

In the automatic entering configuration illustrated in FIG. 12, an authentication (I-have authentication) based on whether or not the user has the token terminal is performed, and in the automatic entering configuration illustrated in FIG. 13, in addition to the I-have authentication, an authentication (I-know authentication) based on whether or not the user knows the own sequence and position is also performed. Hence, the user friendliness is enhanced with the safety of the user name being unchanged from the case in which the key code is directly and manually entered.

Account Information and Black List/White List

In order to enable the server 161 to provide various services in accordance with the user ID successful for the sign-in, an activity like a background of the provided service needs to be managed by a database, or the like, with the user ID acting as a key.

Hence, the server 161 may record, in the database, for example, the user activity (account information) that is the date and hour at which the sign-in is successful, the type of service provided in accordance with the user's request, and the date and hour at which the service is provided.

In addition, the user ID of the user who had caused a problem with the service provided in the past may be registered on the black list at the server 161, and prior to the comparison between the key code and the checkup code or after the successful comparison, whether or not the user ID relating to the sign-in request is registered on the black list may be checked.

According to this configuration, when the user ID is registered on the black list, the server 161 makes the sign-in unsuccessful.

In addition, only particular mail addresses (for example, business mail addresses given to company members) may be registered on the white list at the server 161, and when the user ID is not registered on the white list, the server may make the sign-in unsuccessful.

The white list or the black list may register the specific user ID itself, or may enable the server to check the domain part of the mail address or the country part thereof.

According to those configurations, the consistency between the key code and the checkup code serves as a necessary condition for the successful sign-in.

User ID Alias

In the above embodiment, the user ID that is the mail address, or the like, utilized by the user is adopted. In some cases, however, the user does not want to make the utilizing mail address apparent to the server 161. According to this embodiment, in order to meet such a demand, another name (Alias: alias) of the user ID may be provided. In order to facilitate understanding, the following explanation will be given of an example case in which the mail address is utilized as the user ID and the alias thereof, but the user name of various SNSs, the account name thereof, a mobile phone number that becomes a transmission destination of a short message, various terminal identification information and user identification information utilized for a notification from the server 161 to a smartphone, or the like, utilized by the user are applicable as the user ID and the alias thereof that are various contact information allowing contact with the user.

First, an explanation will be given of an example case in which the main mail address utilized by the user is xxx@yyy.zzz.com. The user is capable of receiving various messages to this mail address at the smartphone that functions as the token terminal 121 or the access terminal 141 capable of transmitting and receiving a mail.

Conversely, the management device 181 also functions as a mail server, and the example domain managed by this mail server is ppp.qqq.com.

The management device 181 issues the alias for xxx@yyy.zzz.com with respect to the token terminal 121 associated with the mail address xxx@yyy.zzz.com that is contact information already confirmed, and registers both pieces of information in the database of the management device 181 in association with each other.

The simplest structure is that the domain name part of the mail address of the issued alias has the domain name managed by the management device 181 adopted as it is, and the user name part is a random and unique letter string. In this case, the alias becomes, for example, t6tsae67-pdsb2kjyb92-s6q8ymp8xa4z9@ppp.qqq.com.

In addition, in order to create the alias, the above one-way function or hash function may be applied to xxx@yyy.zzz.com that is contact information already confirmed, the date and hour at which the alias is issued, and the numerical value indicating the sequence number of the alias, thereby creating the user name part of the mail address.

The management device 181 transfers, when an electronic mail to t6tsae67-pdsb2kjyb92-s6q8ymp8xa4z9@ppp.qqq.com arrives based on the protocol like Send Mail Transfer Protocol (SMTP), this electronic mail to the mail address xxx@yyy.zzz.com. Alternatively, for an application (typically, a program that causes a smartphone to function as the token terminal 121) of the smartphone (typically, the token terminal 121) associated with xxx@yyy.zzz.com, a notification may be given by a notification function provided by the operating system of that smartphone.

A predetermined number of aliases may be issued immediately after xxx@yyy.zzz.com is confirmed at the token terminal 121, the token terminal 121 may store those aliases, and enable the user to select the alias when the server 161 is registered. Every time a request for issuing an alias is made from the token terminal 121, a new alias may be created, and a notification may be given to the token terminal 121.

In addition, in the case of the token terminal 121 that is associated with the user ID which is the contact information already confirmed, when the server is registered, the user may be enabled to specify that the alias is utilized as the user ID. For example, as illustrated in FIG. 9, a choice "issue new alias" may be provided in the user ID list 423, and when this choice is selected, the management device 181 issues a new alias, and makes this alias available as the user ID for the server 161 to be registered.

As illustrated in FIG. 12, the user ID and the key code for each server 161 are presented to the user.

According to this configuration, the user is capable of signing in to the server 161 without letting the server 161 know the main mail address utilized by the user. This enables the user to easily make a trial use.

In addition, since the communication to the user is ensured, the server 161 is capable of transmitting, to the user, messages relating to various advertisements and campaigns. When the user is no longer interested in utilizing the service provided by the server 161, and wants to terminate the utilization of the service, the user may simply quit utilizing the alias itself, or when an electronic mail arrives to the alias from the server 161, the user may make a setting so as to immediately archive the electronic mail from a receive box to a storage box, or may set a SPAM filter per an alias.

In addition, according to this configuration, the user can easily transition the alias from a currently utilizing alias X to a new alias Y.

In this case, like the above embodiment, the user utilizes the new alias Y as the user ID, and signs in to the server 161 from the access terminal 141.

When the sign-in is successful, a transition from the last alias X (including succession, integration, replacement, and the like, of the account information) is requested from the access terminal 141 to the server 161.

When there is a transition request from the old user ID that is X to the new user ID that is Y, the server 161 inquires of the management device 181 as to whether or not both the user IDs that are X and Y are the user IDs utilized by the same user.

The management device 181 obtains the contact information which is registered in association with the respective user IDs that are X and Y, and which is confirmed already regarding the inquiry. When X and Y are the mail address directly associated with the token terminal 121, the contact information that has the mail address already confirmed is obtained, and when X and Y are the alias, the contact information registered in association with this alias and confirmed already is obtained.

Next, a reply as to whether or not the obtained two contact information are consistent with each other is given to the server 161. When the user is the same user, the two contact information are to be consistent with each other. Note that prior to the reply, the management device 181 may transmit a confirmation message that specifies the server 161 that has made an inquiry and both the user IDs that are X and Y to the contact information already confirmed, and may inquire of the user as to whether or not the user wants this transition. When the user does not want this transition, the management device 181 transmits, to the server 161, a reply that the two contact information are inconsistent with each other.

The server 161 receives the reply from the management device 181, and when the contact information which are respectively associated with X and Y and which are already confirmed are consistent with each other, the server determines that this transition is based on the user request, and executes a process of succession, integration or replacement of the user ID.

Hence, according to this embodiment, the user ID can be easily and safely changed. In addition, even if the token terminal 121 is lost or stolen, by simply changing the user ID, the key code order changes, and thus an increase in damage can be suppressed.

The new user ID Y and the old user ID X may be considered as falling in an alias relationship. After the transition is executed as explained above, the old user ID X may be automatically registered on the black list of the server 161.

This technology is applicable to an alias in conventional mail services. For example, a mail service is provided which adds an additional letter string to the user ID with respect to the main mail address xxx@yyy.zzz.com, to provide an available alias like xxx+abc123@yyy.zzz.com or xxx+pqr789@yyy.zzz.com.

According to this service, free alphanumeric characters can be added from+part to @part in the user name, and when a mail addressed to this alias arrives at the mail server, this mail is registered in the receive box of the main mail address.

According to this service, the alias relationship among the user IDs becomes clear upon simply comparing the user IDs with each other. Hence, when the user ID (for example, xxx+pqr789@yyy.zzz.com) relating to the present successful sign-in is the alias of the user ID (for example, xxx@yyy.zzz.com or xxx+abc123@yyy.zzz.com) relating to the past successful sign-in, the user ID relating to the past successful sign-in may be automatically added to the black list.

In this case, as for succession, integration, replacement of the account information, when an automatic transition is performed like the above example, the user ID is automatically changed upon simply signing-in with the ID relating to the new alias.

In addition, no matter what alias is applied without a registration on the black list, a sign-in may be enabled to the account relating to the main address upon consistency between the key code and the checkup code.

Still further, according to the configuration in which the aliases are created in sequence from the main address based on a predetermined rule, and such a creation is synchronized between the token terminal 121 and the server 161, the token terminal 121 may present, to the user, the alias of the user ID to be utilized for the present sign-in.

For example, according to a configuration in which a letter string representing integers is arranged subsequent to the additional letter string, and every time the sign-in is attempted, the integer part is counted up, the user ID is changed regularly like xxx+0001@yyy.zzz.com, xxx+0002@yyy.zzz.com, xxx+0003@yyy.zzz.com, and the like.

As explained above, the key code according to this embodiment may have a dependency on the user ID. Hence, by changing the user ID itself, the order of the key code to be created can be changed.

Accordingly, when, for example, the user wants to change the user ID due to any reason such as a case in which the token terminal 121 is lost, by utilizing the alias, the user ID can be automatically changed without an action by the manager of the server 161.

In addition, when different aliases are utilized for different servers 161, and various kinds of personal information are registered, at the management device 181, those pieces of personal information can be integrated to an original contact information (the user ID which has the validity already confirmed, and which is associated with the token terminal 121).

Hence, even if the respective servers 161 are utilized by different user IDs, the management device 181 is capable of collectively managing the personal information, and under the permission from the user, the personal information can be exchanged between each server 161 and the management device 181.

Details of Share Seed

In the above embodiment, the second function (H) is applied to the user ID (u), the user seed (v), and the present date and hour (d) to obtain the key code (k), or after the checkup seed (w) is calculated, the second function (H) is applied to the calculation result to obtain the checkup code (h).

When only the user ID is taken as the share seed without a reference given to the present date and hour, and this configuration is applied for distributing the unchangeable password, the management device 181 calculates the user seed (v) beforehand like:

$v=F(u, s)$, and stores this user seed (v) in the token terminal 121.

Next, when the user needs the key code (k) to be utilized for the sign-in, the token terminal 121 calculates:

$$k=H(u,v),$$

while the server 161 calculates the checkup code (h) as:

$$h=H(u,F(u,s)).$$

The user ID (u) is reflected on the user seed (v) and the checkup seed $w=F(u, s)$ calculated by the server 161. Hence, as explained below, the user ID (u) may not be utilized as the share seed. That is, the token terminal 121 and the server 161 independently obtain the present date and hour (d) and the present date and hour (e), respectively, and the token terminal 121 calculates:

$$(c1) k=H(v,d),$$

while the server 161 calculates:

$$(c2) h=H(F(u,s),e).$$

In general, the second function is applied to the user seed (v) or the checkup seed (w=F(u, s)), and the share seed.

In this case, when the user ID, the current date and hour, or both of the user ID and the current date and hour are adopted as the share seed, when the sign-in is attempted, a communication or an interaction between the token terminal 121 and the server 161 become unnecessary.

In addition, a captcha (CAPTCHA) may be adopted as the share seed. That is, the server 161 may create a captcha, such as a letter string set at random, an image readable for a human but difficult for mechanical letter recognition, or sound that a human can hear and can be changed to a letter string, in the sign-in form displayed by the browser of the access terminal 141 or the log-in prompt displayed by the terminal software, and this captcha is presented to the user. In addition, the server 161 calculates the checkup code with the created captcha being as the share seed.

The user enters, in the token terminal 121, the provided captcha from the server 161 before the token terminal 121 displays the key code. The token terminal 121 calculates the key code with the entered captcha being as the share seed.

According to this configuration, the captcha is created by the server 161, and entered and shared by the token terminal 121, but a direct communication or interaction between the server 161 and the token terminal 121 are unnecessary, and the user gives the share seed between those devices. When the user ID is taken as the share seed, the user gives the share seed to the server 161, but when the captcha is taken as the share seed, the user gives the share seed to the token terminal 121, and thus the giving direction is inverted.

In order to prepare for a loss and theft of the token terminal 121, every time or intermittently when the token terminal 121 presents the key code, the utilized user ID, the identification information on the token terminal 121, the location of the token terminal 121 measured by GPS, and the like, may be reported to the management device 181. According to this configuration, the server 161 manages the user activity at both ends that are the token terminal 121 and the access terminal 141. Hence, every time a sign-in request is made, an inquiry is given to the management device 181, and the details of the final report from the management device 181 are obtained.

According to this configuration, the identification information on the token terminal 121 itself, the location of the token terminal 121 measured by GPS, and the like, can be adopted as the share seed.

In addition, geographical information on the location where the stationary access terminal 141 is placed can also be adopted as the share seed.

For example, this embodiment may be applied as an electronic lock for facilities, such as a hotel, a guest house, a delivery locker, and a coin locker. In this case, as for the input device for the access terminal 141, a touch screen, a ten key, and the like, are provided around the door of the facility that the user wants to utilize.

The user selects, from the token terminal 121, the slot relating to the facility that the user wants to utilize or the facility that the user made a reservation. Next, the user ID like the mail address utilized when the reservation was made, a reservation number, a locker number, or the like, is also entered as needed.

In this case, the token terminal 121 checks the own location (for example, an altitude and a longitude expressed by a predetermined precision, or an address, a lot number) by the own GPS sensor.

Next, the token terminal 121 utilizes the obtained location of the token terminal 121 as the share seed to calculate the key code, and presents the key code to the user. The user enters, in the access terminal 141 provided with a touch screen, and the like, placed at the door of the reserved facility, the presented key code. This causes the access terminal 141 to transmit the sign-in request to the server 161 that manages the facility reservation.

When any of the servers 161 receives the sign-in request, such a server obtains, from the management database, the location of the facility where the touch screen, and the like, are placed to which the key code relating to the sign-in request is entered, and sets the obtained location as the share seed.

As explained above, according to this configuration, the token terminal 121 obtains the share seed by the GPS sensor, while the server 161 obtains, from the management database, the location where the access terminal 141 that is the transmission originator of the sign-in request, and utilizes the obtained location as the share seed. Hence, the smartphone, or the like, utilized by the facility user can serve as an electronic key without a physical key being prepared.

In the above explanation, since the positional information and the date and hour information are expressed in a predetermined unit, a consideration for an error when the location and the date and hour are near the boundary between the respective units is necessary. When, for example, the date and hour is expressed in a unit that is 1 hour, an example case in which the present date and hour obtained by the server 161 is 13:58 will be explained below.

In this case, the server 161 first adopts 13:00 as the share seed to calculate the checkup code, and compares this checkup code with the key code. When both codes are not consistent with each other, 14:00 is then adopted as the share seed to calculate the checkup code, and this checkup code is compared with the key code to determine whether or not to permit the sign-in.

Conversely, when the present date and hour is 13:24, this is sufficiently apart from the boundary between the respective units, only 13:00 may be adopted as the share seed.

As explained above, when the obtained location and date and hour information by the server 161 are within a predetermined error range before and after the boundary between the respective predetermined units, both pieces of information before and after the boundary may be adopted as the share seed.

User ID and Confidential Information

In the case of Internet banking, or the like, the user receives a contact from a bank via the mail address, and manages the bank account based on the account number. Hence, the mail address is utilized as the user ID, but at the time of sign-in, the account number may be entered instead of the mail address to the access terminal 141, and the entered information may be taken as the user identification information.

According to this configuration, the server obtains, from the database for the account information, the mail address corresponding to the entered account number at the time of sign-in, and sets the obtained mail address as the user ID.

Like the account number, when the information to be entered at the time of sign-in requires a higher security level than that of the information utilized as contact information, the user identification information to be entered at the time of sign-in is not recorded in the token terminal 121, but the user memorizes this information. The server 161 obtains the user ID from the user identification information entered by the user at the time of sign-in. When the user ID is obtained in this way, the above embodiment is applicable.

Relationship with Program

The token terminal 121, the access terminal 141, the server 161, and the management device 181 of the above embodiments may be accomplished by the hardware resources of various computers that run various programs.

In general, a computer reads a program recorded in a non-transitory information recording medium in a Random Access Memory (RAM) that is a temporary memory device, and causes a Central Processing Unit (CPU) or a processor to execute instructions contained in the read program. According to an architecture in which the ROM and the RAM are mapped in a single memory space and executable, the instructions contained in the program in the ROM may be directly read and executed by the CPU. The CPU or the processor work together with the RAM, and the like, and control hardware devices, such as a Network Interface Card (NIC), a display, a microphone, and a speaker.

In this case, each program can be recorded in a non-transitory computer readable information recording medium, such as a compact disc, a flexible disk, a hard disk, a magneto-optical disk, a digital video disk, a magnetic tape, a Read Only Memory (ROM), an Electrically Erasable Programmable ROM (EEPROM), a flash memory, or a semiconductor memory. This non-transitory information recording medium can be distributed and sold separately from each hardware device.

In addition, the above program can be distributed to each hardware device from a distribution device via a transitory transmission medium like a computer communication network independently from the computer that runs the program.

The above program may be described in a programming language that is for describing an action level of an electronic circuit. In this case, various design diagrams, such as a wiring diagram of the electronic circuit and a timing chart, are created from the above program, and an electronic circuit that constructs the above image processing device can be created based on the design diagrams. For example, the above image processing device may be constructed on a re-programmable hardware device by a Field Programmable Gate Array (FPGA) technology from the above program, or a dedicated electronic circuit may be constructed by an Application Specific Integrated Circuit (ASIC) technology.

In this case, each part of the token terminal 121, the access terminal 141, the server 161, and the management device 181 is configured so as to executed the assigned process.

Summary

As explained above, according to this embodiment, provided is the following authentication system for the server to determine whether or not to permit a sign-in via the access terminal using the token terminal to the server to which the site seed is assigned in a manner not opened to the public. That is, the authentication system is configured as follows:

(1) in order to enable a user of the token terminal to register the server in the token terminal:

(a) the token terminal has specified access information to sign-in to the server, and transmits the specified access information to a management device;

(b) the management device applies a first function to at least the transmitted access information and the site seed assigned to the server, thereby obtaining a user seed with respect to the server, and transmits the obtained user seed to the token terminal;

(c) the token terminal records the transmitted user seed, thereby registering the server in the token terminal;

(2) in order to enable the user to attempt a sign-in to the server via the access terminal using the token terminal in which the server is registered:

(d) the token terminal obtains a share seed independently obtained from the server with respect to the attempted sign-in, and shared with the server, and applies a second function to at least the obtained share seed and the recorded user seed, thereby obtaining a key code, and presents the obtained key code to the user;

(e) the access terminal receives the presented key code by the token terminal to the user, and transmits, to the server, a request that specifies the received key code; and (f) the server receives the transmitted request, obtains access information relating to the received request, applies the first function to at least the obtained access information and the site seed assigned to the server, thereby obtaining a checkup seed, obtains a share seed independently obtained from the token terminal with respect to the attempted sign-in, and shared by the token terminal, applies the second function to at least the obtained shared seed and the obtained checkup seed, thereby obtaining a checkup code, and sets a necessary condition to permit the sign-in relating to the request via the access terminal in which the received key code and the obtained checkup code are consistent with each other.

In the above authentication system:
the access information specified at the token terminal may contain a user ID to sign-in to the server;
the access terminal may receive the user ID to sign-in to the server;
the access terminal may transmit the received user ID to the server, or specify the user ID in the request, and may transmit the request to the server; and
the access information obtained at the server may contain the transmitted user ID or the specified user ID in the request.

In the above authentication system:
the token terminal may obtain the share seed that is a present date and hour expressed in a predetermined unit; and
the server obtains the share seed that is a present date and hour expressed in the predetermined unit.

In the above authentication system:
the token terminal may record the transmitted user seed and the specified user ID in association with each other;
the token terminal may obtain the share seed that is the recorded user ID; and
the server may obtain the share seed that is the received user ID.

In the above authentication system:
the server may create a captcha (CAPTCHA);
the server may obtain the share seed that is the created captcha;
the server may transmit the created captcha to the access terminal;
the access terminal may present, to the user, the transmitted captcha from the server;
the token terminal may prompt the user to enter the presented captcha by the access terminal in the token terminal; and
the token terminal may obtain the share seed that is the entered captcha.

In the above authentication system:
the specified access information at the token terminal may contain terminal identification information assigned to the access terminal to sign-in to the server;
the server may obtain the terminal identification information assigned to the access terminal having transmitted the request upon receiving the request; and
the server may obtain the access information that contains the obtained terminal identification information.

In the above authentication system:
the token terminal may record the transmitted user seed and the specified user ID in association with each other;
the token terminal may create an alias of the recorded user ID, and obtains the share seed that is the created alias;
the token terminal may prompt the user to cause the access terminal to receive the created alias as the user ID to sign-in to the server;
the server may obtain the share seed that is the received user ID;
the server may obtain the original user ID that has an alias, the alias being the received user ID; and
the server may permit the sign-in via the access terminal for the account information relating to the obtained original user ID.

In the above authentication system:
the first function may be a one-way function, and a bit number of a result obtained upon applying the first function is equal to or greater than a bit number of a parameter to which the first function is applied; and the second function may be a hash function, and a result obtained upon applying the second function has a predetermined letter string length.

In the above authentication system:

in order to enable the user to register the server in the token terminal, the user may specify the user ID that is either:

(g) contact information that has a validity already confirmed by the management device; or (h) an alias associated with contact information by the management device;

a message to the alias is transmitted to the management device, and the management device transmits the message to the contact information associated with the alias.

In the above authentication system:

in order to enable the user to register the server in the token terminal, when the user specifies the user ID that is an alias to be associated with the contact information by the management device, and not transmitted yet to the token terminal from the management device:

(i) the management device may transmit, to the token terminal, the associated alias together with the user seed;

(j) the token terminal may regard the transmitted alias as the specified user ID; and in order to enable the user to sign-in to the server via the access terminal using the token terminal to which the server is registered:

(k) the token terminal may present, to the user, the alias regarded as the user ID and registered together with the obtained key code.

In the above authentication system after the sign-in via the access terminal using the received user ID is permitted:

when receiving a different specified user ID from the access terminal, the server transmits, to the management device, an inquiry as for whether or not the user ID relating to the permitted sign-in and the different specified user ID are the contact information of the same user or the aliases associated with the contact information; and the management device transmits, to the server, a reply indicating whether or not the user ID relating to the permitted sign-in and the different user ID are the contact information of the same user or the aliases associated with the contact information.

In the above authentication system after the sign-in via the access terminal using the received user ID is permitted:

the server may receive, from the access terminal, a request for a succession, an integration, or a replacement of the account information between the user ID permitted for the sign-in and the different user ID, the server transmits an inquiry to the management device; and when a reply indicating that the user ID permitted for the sign-in and the different user ID are contact information of the same user or aliases associated with the contact information is transmitted from the management device, the server may execute a process for succession, integration or replacement of the account information relating to the request.

In the above authentication system, in order to determine whether or not each of a plurality of the servers to which different site seeds not opened to public are assigned permits a sign-in to each server:

the management device may share the site seed assigned to each of the plurality of servers with each of the servers in a manner not opened to the public for the other servers;

the management device may share the first function with the plurality of servers in a manner not opened to the public;

the token terminal may cause the user to specify a registration code associated with any of the plurality of servers; and the token terminal may determine that the server associated with the specified registration code is the server to be registered in the token terminal.

In the above authentication system, when the validity of the transmitted user ID is:

(x) already confirmed, the management device obtains a user seed relating to the server; and (y) not confirmed yet, the management device may transmit an inquiry to an address that is the transmitted user ID, confirm that the user ID that is the inquiry destination is valid upon receiving a reply to the transmitted inquiry, and then obtain a user seed relating to the server.

In the above authentication system, the server may set a necessary condition for permitting the sign-in via the access terminal using the received user ID, the necessary condition being a matching of the received user ID with a permission pattern or a mismatching with a rejection pattern.

In the above authentication system:

the access terminal may receive, instead of the user ID, user identification information associated with the user ID at the server to which the user attempts to sign in;

the access terminal may transmit the received user identification information to the server;

the server may receive the transmitted user identification information from the access terminal; and the server may obtain the user ID associated with the user identification information received at the server, and take the obtained user ID as the received user ID.

In the above authentication system, the token terminal may be accomplished by the access terminal.

In the above authentication system, the management device may be accomplished by the server or the token terminal.

In addition, provided are a program and a non-transitory computer readable information recording medium having stored therein the program that causes a computer to function as the above token terminal.

Still further, provided are a program and a non-transitory computer readable information recording medium having stored therein the program that causes a computer to function as the above server.

Yet still further, provided are a program and a non-transitory computer readable information recording medium having stored therein the program that causes a computer to function as the above management device.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

According to the present disclosure, provided are an authentication system suitable for safely presenting, to a user, a key code to sign-in to a server from an access terminal using a token terminal, and a non-transitory computer readable information memory medium having stored therein a program that causes a computer to function as the token terminal, a management device, or the server.

REFERENCE SIGNS LIST

101 Authentication system
121 Token terminal
141 Access terminal
161 Server
181 Management device
401 User ID entry form
402 User ID entry field
403 "next" button
404 "cancel" button
411 Secret information entry form
412 Secret information entry field
413 User ID display field
421 Server registration form
422 Collaboration code entry field
423 User ID list
431 Service selection form
432 Slot button
441 Key code form
442 Key code field
443 User ID field
444 Server field
445 "open" button

The invention claimed is:

1. An authentication system for a server to determine whether or not to permit a sign-in to the server to which a site seed not opened to public is assigned via an access terminal using a token terminal, the system configured to:
   (1) enable a user of the token terminal to register the server in the token terminal by:
      (a) enabling the token terminal to have specified access information to sign-in to the server, and enabling the token terminal to transmit the specified access information to a management device;
      (b) applying, via the management device, a first function to at least the transmitted access information and the site seed assigned to the server, thereby obtaining a user seed with respect to the server, and transmitting the obtained user seed to the token terminal; and
      (c) recording, via the token terminal, the transmitted user seed, thereby registering the server in the token terminal; and
   (2) enable the user to attempt a sign-in to the server via the access terminal using the token terminal in which the server is registered by:
      (d) enabling the token terminal to obtain a share seed independently obtained from the server with respect to the attempted sign-in, and shared with the server, apply a second function to at least the obtained share seed and the recorded user seed, thereby obtaining a key code, and present the obtained key code to the user;
      (e) receiving, via the access terminal, the presented key code by the token terminal to the user, and transmitting, to the server, a request that specifies the received key code; and
      (f) receiving, via the server, the transmitted request, obtaining access information relating to the received request, applying the first function to at least the obtained access information and the site seed assigned to the server, thereby obtaining a checkup seed, obtaining a share seed independently obtained from the token terminal with respect to the attempted sign-in, and shared by the token terminal, applying the second function to at least the obtained shared seed and the obtained checkup seed, thereby obtaining a checkup code, and setting a necessary condition to permit the sign-in relating to the request via the access terminal in which the received key code and the obtained checkup code are consistent with each other.

2. The authentication system according to claim 1, wherein:
   the access information specified at the token terminal contains a user ID to sign-in to the server;
   the access terminal receives the user ID to sign-in to the server;
   the access terminal transmits the received user ID to the server, or specifies the user ID in the request, and transmits the request to the server; and
   the access information obtained at the server contains the transmitted user ID or the specified user ID in the request.

3. The authentication system according to claim 1, wherein:
   the token terminal obtains the share seed that is a present date and hour expressed in a predetermined unit; and
   the server obtains the share seed that is a present date and hour expressed in the predetermined unit.

4. The authentication system according to claim 2, wherein:
   the token terminal records the transmitted user seed and the specified user ID in association with each other;
   the token terminal obtains the share seed that is the recorded user ID; and
   the server obtains the share seed that is the received user ID.

5. The authentication system according to claim 1, wherein:
   the server creates a captcha (CAPTCHA);
   the server obtains the share seed that is the created captcha;
   the server transmits the created captcha to the access terminal;
   the access terminal presents, to the user, the transmitted captcha from the server;
   the token terminal prompts the user to enter the presented captcha by the access terminal in the token terminal; and
   the token terminal obtains the share seed that is the entered captcha.

6. The authentication system according to claim 1, wherein:
   the specified access information at the token terminal contains terminal identification information assigned to the access terminal to sign-in to the server;
   the server obtains the terminal identification information assigned to the access terminal having transmitted the request upon receiving the request; and
   the server obtains the access information that contains the obtained terminal identification information.

7. The authentication system according to claim 2, wherein:
   the token terminal records the transmitted user seed and the specified user ID in association with each other;
   the token terminal creates an alias of the recorded user ID, and obtains the share seed that is the created alias;

the token terminal prompts the user to cause the access terminal to receive the created alias as the user ID to sign-in to the server;

the server obtains the share seed that is the received user ID;

the server obtains the original user ID that has an alias, the alias being the received user ID; and the server permits the sign-in via the access terminal for the account information relating to the obtained original user ID.

8. The authentication system according to claim 1, wherein:

the first function is a one-way function, and a bit number of a result obtained upon applying the first function is equal to or greater than a bit number of a parameter to which the first function is applied; and the second function is a hash function, and a result obtained upon applying the second function has a predetermined letter string length.

9. The authentication system according to claim 2, wherein:

the user ID is either:

(g) contact information that has a validity already confirmed by the management device; or (h) an alias associated with contact information by the management device, wherein a message to the alias is transmitted to the management device, and the management device transmits the message to the contact information associated with the alias.

10. The authentication system according to claim 9, wherein:

to enable the user to register the server in the token terminal, when the user specifies the user ID that is the alias to be associated with the contact information by the management device, and not transmitted yet to the token terminal from the management device, the system is configured to:

(i) transmit, from the management device to the token terminal, the associated alias together with the user seed; and (j) enable the token terminal to determine the transmitted alias as the specified user ID; and to enable the user to sign-in to the server via the access terminal using the token terminal to which the server is registered, the system is configured to:

(k) enable the token terminal to present, to the user, the alias regarded as the user ID and registered together with the obtained key code.

11. The authentication system according to claim 9, wherein after the sign-in via the access terminal using the received user ID is permitted:

when receiving a different specified user ID from the access terminal, the server transmits, to the management device, an inquiry as for whether or not the user ID relating to the permitted sign-in and the different specified user ID are the contact information of the same user or the aliases associated with the contact information; and the management device transmits, to the server, a reply indicating whether or not the user ID relating to the permitted sign-in and the different user ID are the contact information of the same user or the aliases associated with the contact information.

12. The authentication system according to claim 11, wherein after the sign-in via the access terminal using the received user ID is permitted:

the server receives, from the access terminal, a request for a succession, an integration, or a replacement of the account information between the user ID permitted for the sign-in and the different user ID, the server transmits an inquiry to the management device; and when a reply indicating that the user ID permitted for the sign-in and the different user ID are contact information of the same user or aliases associated with the contact information is transmitted from the management device, the server executes a process for succession, integration or replacement of the account information relating to the request.

13. The authentication system according to claim 1, wherein in order to determine whether or not each of a plurality of the servers to which different site seeds not opened to public are assigned permits a sign-in to each server:

the management device shares the site seed assigned to each of the plurality of servers with each of the servers in a manner not opened to public for the other servers;

the management device shares the first function with the plurality of servers in a manner not opened to public;

the token terminal causes the user to specify a registration code associated with any of the plurality of servers; and the token terminal determines that the server associated with the specified registration code is the server to be registered in the token terminal.

14. The authentication system according to claim 2, wherein when the validity of the transmitted user ID is:

(x) already confirmed, the management device obtains a user seed relating to the server; and (y) not confirmed yet, the management device transmits an inquiry to an address that is the transmitted user ID, confirms that the user ID that is the inquiry destination is valid upon receiving a reply to the transmitted inquiry, and then obtains a user seed relating to the server.

15. The authentication system according to claim 2, wherein the server sets a necessary condition for permitting the sign-in via the access terminal using the received user ID, the necessary condition being a matching of the received user ID with a permission pattern or a mismatching with a rejection pattern.

16. The authentication system according to claim 2, wherein:

the access terminal receives, instead of the user ID, user identification information associated with the user ID at the server to which the user attempts to sign in;

the access terminal transmits the received user identification information to the server;

the server receives the transmitted user identification information from the access terminal; and the server obtains the user ID associated with the user identification information received at the server, and takes the obtained user ID as the received user ID.

17. The authentication system according to claim 1, wherein the token terminal is accomplished by the access terminal.

18. The authentication system according to claim 1, wherein the management device is accomplished by the server or the token terminal.

19. The authentication system according to claim 1, wherein the token terminal includes a non-transitory computer readable information recording medium having stored therein a program that causes a computer to perform (a), (c), and (d).

20. The authentication system according to claim 1, wherein the server includes a non-transitory computer readable information recording medium having stored therein a program that causes a computer to perform (f).

21. The authentication system according to claim 1, wherein the management device includes a non-transitory computer readable information recording medium having stored therein a program that causes a computer to perform (b).

* * * * *